United States Patent

Ruehle et al.

Patent Number: 5,940,080
Date of Patent: Aug. 17, 1999

[54] METHOD AND APPARATUS FOR DISPLAYING ANTI-ALIASED TEXT

[75] Inventors: Glenn Warren Ruehle, Novato; George Marshall Halford, San Francisco, both of Calif.

[73] Assignee: Macromedia, Inc., San Francisco, Calif.

[21] Appl. No.: 08/712,888

[22] Filed: Sep. 12, 1996

[51] Int. Cl.⁶ ................................................. G06T 5/50
[52] U.S. Cl. ................................. 345/432; 345/136
[58] Field of Search ................................. 345/431, 432, 345/441, 467, 468, 144, 136, 435

[56] References Cited

U.S. PATENT DOCUMENTS

| | | |
|---|---|---|
| 4,704,605 | 11/1987 | Edelson . |
| 4,908,780 | 3/1990 | Priem . |
| 4,918,626 | 4/1990 | Watkins et al. . |
| 5,065,144 | 11/1991 | Edelson et al. . |
| 5,123,085 | 6/1992 | Wells et al. . |
| 5,239,625 | 8/1993 | Bogart et al. . |
| 5,261,030 | 11/1993 | Brooke . |
| 5,295,235 | 3/1994 | Newman . |
| 5,303,334 | 4/1994 | Snyder et al. . |
| 5,369,739 | 11/1994 | Akeley . |
| 5,422,995 | 6/1995 | Aoki et al. . |
| 5,490,238 | 2/1996 | Watkins . |
| 5,497,434 | 3/1996 | Wilson . |
| 5,568,167 | 10/1996 | Galbi et al. ........................ 345/136 X |

*Primary Examiner*—Mark K. Zimmerman
*Attorney, Agent, or Firm*—Hecker & Harriman

[57] ABSTRACT

The present invention provides a method and apparatus for displaying anti-aliased text. Text on a computer display device typically contains "jaggy" edges (referred to as aliased text). The method of the present invention smoothes such "jaggy" edges by blending the edges of text into the color background the text is being rendered on. A mask or alpha channel is created through which the text is rendered. The mask is created by drawing the text at a larger size (typically 4 times the size) and shrinking the image down or by using an outline vector extraction method. The mask is used to blend a bitmap representation of the text into the background. The present invention utilizes run-length compression to encode the alpha channel data. Additionally, to avoid the need for an original bitmap, the present invention encodes the text color information into the mask data, creating a unique bitmap/mask hybrid. Due to the creation and storage of a hybrid bitmap/mask, the memory requirements are significantly decreased. Further, when rendering the text, the run length compression provides the ability to ignore/skip multiple pixels. Consequently, the run length compression provides the ability to avoid blending or mixing the background image with the source color for multiple pixels.

18 Claims, 15 Drawing Sheets

100%

Regular Text	Magnified View

1/8 of 100%

1/3 of 100%

100%

Anti-Aliased Text
Magnified View

100%

100%

METHOD AND APPARATUS FOR DISPLAYING ANTI-ALIASED TEXT

BACKGROUND OF THE INVENTION

1. Field of the Invention

This invention relates to the field of anti-aliased text. More particularly, the invention relates to the storage of anti-aliased text data information and the displaying/rendering of such anti-aliased text in real time.

2. Background Art

When words or text are displayed on a computer display, it is desirable that the edges of each letter be smooth and look realistic. Text that does not look smooth is sometimes referred to as "aliased" text. The current methods of solving the problems of aliased text are slow and use too much computer memory. A background of computer displays and the problems of antialiased text, along with a description of the disadvantages of prior art antialias schemes, is described below.

If you looked closely at a computer display, you would see that an image is made up of hundreds or thousands of tiny dots, where each dot is a different color. These dots are known as picture elements, or "pixels" for short. The color of each pixel is represented by a number value. To store an image in a computer memory, the number value of each pixel of the picture is stored. The number value represents the color and intensity of the pixel.

FIG. 1 is an enlarged portion of a display screen. Each square represents a pixel on a display device. The horizontal line is referred to as the x-axis and the vertical line is referred to as the y-axis. When a text character or symbol is drawn on a display device, the objective is to draw a series of small solid lines which make up that text character. FIG. 1 illustrates how a user would prefer to have a line (or part of a character) drawn on a display device. In this respect, line 102 can be viewed as a part of an ideal text character. An ideal line may not fill an entire pixel. For example, line 102 only uses part of pixel 104 and an even smaller portion of pixel 106. However, when displaying a line, the user cannot turn on a part of a pixel. The user may adjust the levels of intensity of that pixel, but the entire pixel must be illuminated.

When drawing a line or writing text (which contains many lines), the first step is to choose which initial pixel will be illuminated. Thus, in FIG. 1, the first (initial) pixel that would be chosen to be turned on would be that at location (1,1) or pixel 108. The next pixel is then chosen. In FIG. 1, the next pixel chosen to be illuminated is either pixel 104 or pixel 106. For purposes of example, assume that the computer selects pixel 104 (due to the fact that a higher percentage of pixel 104 contains the line than the percentage contained in pixel 106). The computer then must choose the next pixel, which will likely be pixel 110, then pixel 112. The resulting line is then illuminated and is illustrated in FIG. 2, with pixels 208, 204, 210, and 212 illuminated. The pixels of the text line are black, the pixels of the background are white. As demonstrated in FIG. 2, the line has "jaggy" or "jagged" edges, or the appearance of a staircase. Such an appearance is referred to as "aliasing". FIG. 2 demonstrates aliasing at the pixel level. FIG. 3 demonstrates the effect of aliasing at an increased or viewing level. The text message "Hello, World" of FIG. 3 is aliased. The individual letters of "Hello, World" have jagged edges and a staircase effect. Such aliasing can be more clearly seen in the magnified view of the letter "o" in FIG. 3.

Anti-aliasing is the process of smoothing the "jaggy" edges typically associated with text drawn on computer screens. To smooth the "jaggy" edges, various different levels of intensity are applied to the surrounding/boundary pixels. Such smoothing is performed by combining the color of the source (or the line/text) and the destination (background). Instead of filling all of the pixels with the same intensity level, all pixels that are overlapped by the line area are displayed with an intensity proportional to the area of overlap. Thus, if a pixel has about half its area inside of the line/text, the intensity of that pixel would be adjusted to one-half of its normal intensity. In the same manner, if a pixel has about one-third of its area inside of the line/text, the intensity of that pixel would be adjusted to one-third of its normal intensity. Similar adjustments, based on the percent of pixel area coverage, are applied to the other intensity values around the border.

FIG. 4 illustrates smoothing at the pixel level. Rather than leaving pixel 406 (or pixel 206 of FIG. 2) blank or non-illuminated, an anti-aliasing process would illuminate pixel 406 with an intermediate level of intensity. Since about one-eighth of pixel 406 is inside the line (see pixel 106 of FIG. 1), the intensity level of 406 would be adjusted to about one-eighth of 100%. The level of intensity is applied in the color of the text. In the example of FIG. 4, the source (text) color is black. As a result, one-eighth of 100% black is illuminated in pixel 406.

Similarly, instead of completely illuminating pixel 404 (or pixel 204 of FIG. 2), an intermediate shade is illuminated (about one-third of 100% due to the fact that about one-third of the pixel is inside the line). Referring to FIG. 1, it can be seen that the line 102 consumes a greater percentage of pixel 104 than of pixel 106. As a result, the intensity level of pixel 104 should be slightly higher/darker than that of pixel 106 (one-third verses one-eighth). Such a difference in intensity levels can be seen in FIG. 4. Pixel 404 has a slightly darker shade than that of pixel 406.

By illuminating the surrounding/boundary pixels at varying levels of intensity, the staircase effect diminishes. Moreover, when viewed from a distance, the staircase effect appears significantly diminished. Referring to FIG. 5, the process above has been applied to the aliased version of "Hello World" (text of FIG. 3). The message "Hello, World" of FIG. 5 now appears smooth at the curved and slanted boundaries. The magnified view of the letter "o" to the right reveals that some of the pixels at the boundary between the letter and the background have been shaded to a blend of the background and text colors. The process of coloring and drawing anti-aliased text with appropriate shading of the boundary pixels is referred to as rendering of anti-aliased text.

Various prior art anti-aliasing methods have developed. One prior art method is termed "pixel phasing". In pixel phasing, intensities of line edges are adjusted by "micropositioning" of the electron beam. Thus, the electron beam which illuminates a pixel is repositioned. The systems incorporating this technique are designed so that individual pixel positions can be shifted by a fraction of a pixel diameter. By allowing shifts of ¼, ½, and ¾ of a pixel diameter, a line can be displayed by plotting points closer to the true path of the line. Thus, the pixels (pixel beam) themselves are repositioned and illuminated. These systems also allow the size of individual pixels to be altered. However, such a prior art approach requires additional computer hardware which permits such repositioning of the pixels. Further, such a method will leave gaps in the areas where the pixel position has been shifted away from.

FIG. 6 shows an example of another prior art method. According to this method, the raw text is drawn at a larger size (typically four times the size) than the final size. For example, the text "Hello, World" is drawn in large size (e.g. four times larger) in FIG. 6 (602). In this manner, each pixel can be divided into four sub-pixels. Such a division permits one to estimate how much of a pixel is inside the line or text. For example, if three out of the four subpixels are inside of the line/text, then the intensity level will be adjusted to 75%. Similarly, if two out of the four subpixels are inside of the line/text, then the intensity level will be adjusted to 50%.

The image is then shrunk to create a mask 604, also called an "alpha channel mask." The mask contains all of the intensity levels to be utilized. As can be seen in the magnified view 606, the mask contains intermediate levels of intensity in the boundary/surrounding pixels. This mask is used to blend a representation of the text "Hello, World" into the background. In this prior art method, both the source image (text/line) 602 and the mask 604 are stored, using memory resources.

To render or draw the image onto the display device, each bit of the source image (the text "Hello, World", color and pattern information) is blended with the mask image (604) and applied to the destination (a computer display screen), a time consuming process and one which must be repeated many times if the text is moved or scrolled on the display. In other words, the mask retains the information regarding the various level of intensities and the original source image/text retains the information regarding what color or pattern the text is.

For example, assume that the message "Hello, World" is comprised of multiple colors, such that half of the "H" is blue and half is green. In the same respect, assume that the remaining letters change so that the phrase "Hello, World" is made up of all the colors of the rainbow. The mask would contain information on the "H" such that a pixel in the middle of the H is illuminated in 100% of the source color. The mask does not contain information regarding what that source color is.

The source image retains the color information. As a result, the source image would contain the color blue for that pixel, or a mix of green and blue for another part of the H. The mask would also contain information of a pixel towards the boundary of "H" such that the particular pixel only gets 50% of some source color (whatever it may be). The source image (the text "Hello, World" in all of the colors) provides the source color. In this manner, for each pixel, the source color is obtained from the source image and applied to the destination according to the percentages from the mask. Thus, when rendering the final anti-aliased image to the screen, the mask/intensity value is obtained . . . the color is obtained . . . and the pixel is displayed in the appropriate color with the appropriate intensity. In this respect, both the source image and the mask are utilized.

This prior art method of enlarging the text, shrinking the text to create a mask and rendering the image, is known as "super-sampling and reduction". In short, this method creates an alpha channel mask through which anti-aliased text is rendered. This method is slow in that it requires approximately one to two seconds to draw a full screen of the anti-aliased text. The method also requires large amounts of memory to store the image of the raw text (source image and color) and the alpha channel mask. In other words the prior art stores an uncompressed bitmap form of the text and the mask information, both of which are memory intensive.

Another prior art method, extracts vector information out of an outline font (TrueType and Postscript fonts) and calculates the value of every pixel as it is drawn. In other words, the outline information of a particular font, which is made up of a series of bezier curves (which make up each character), is read. Using this outline information, the amount/percentage of the pixel which needs to be drawn is calculated. The percentages are then used to create an alpha-channel mask (similar to the mask created above) through which the antialiased text may be rendered.

The above super sampling and vector extraction techniques assume that the background to which the text is applied is white/blank such that all that is needed in the rendering process is to apply the source color to the display device at a certain intensity level. However, such techniques are complicated when text is being placed on top of another image with multiple colors such as a scanned photograph. In such a situation, not only must the intensity level be applied to the source color, but that combined image must then be mixed with the background image (scanned photograph).

For example, after obtaining a mask value of 75%, and looking to the source image which provides information that the source color is blue, the 75% blue must then be mixed with the background image. If the text is being placed over an orange sunset, then the 75% blue pixel is mixed with a 25% orange value. The final mix value is then illuminated on the display device. Similarly, if a 75% blue text character is being placed over a green tree, then the 75% blue pixel is mixed with a 25% green value and the final mixed value is illuminated on the display device.

An example which does not use colored text but patterned text is illustrated in FIG. 7. A source image or the pattern of the text 702 is retained in a source data block. In FIG. 7, the source image is a pattern containing a black background with white patterned dots 702. The mask 704 which was created is saved in another data block. The mask 704 contains the text "Hello, World". The image which the text is being placed on is a map of the world 706, and is referred to as the "destination". When drawing a boundary pixel of the final image 708, various steps occur: (1) the source pattern is obtained; (2) the mask/intensity value is obtained; (3) the appropriate intensity level of the pattern is mixed with the background 706; (4) the final mixed value is illuminated on the screen. Essentially, the source pattern 702 is filtered through (or peeks through) the mask 704 onto the resulting displayed image 708. The text has been anti-aliased by the mask filtering process and does not appear to have "jaggy" edges in the resulting display 708. As stated above, using the prior art method to perform such anti-aliasing consumes memory and is slow in that it requires approximately one to two seconds to draw the full screen of the final anti-aliased text.

The prior art use of memory is illustrated in FIG. 8. The memory unit 802 stores all data information. If anti-aliasing of the text were not performed, such data information would include the source text/color map 804 and a background or destination image 808. However, when performing anti-aliasing using the prior art, such data information includes the source text/color map 804, the mask 806, and the background or destination 808. All of which are in uncompressed bitmap form. The storage of data in this format is memory intensive (consumes a great deal of memory). In the prior art, the mask 806 and source text/color map 804 are blended 810 and the blended source-mask is mixed with the background 812 immediately prior to rendering on the display device 810. Nonetheless, the color map and mask remained stored in an uncompressed bitmap form. As FIG. 8 illustrates, using the prior art method to perform anti-aliasing consumes memory.

In the modern trend of today's computer systems, applications have grown technologically and in complexity.

CD-ROM (Compact Disc-Read Only Memory) technology and increased processor speeds have enabled video, photographs, sound, and other multimedia tools to be effectively utilized by computer users. Nonetheless, programs which use the multimedia tools (referred to as multimedia applications) to display text messages still suffer from aliasing as described above. Due to the slow rendering process in the prior art, rendering text messages in real time in multimedia applications has been inadequate. Multimedia applications typically need to redraw full screen images in less than 1/10 of a second. The prior art methods, even when optimized, take approximately 1–2 seconds to draw a full screen of anti-aliased text on a common computer. When scrolling such anti-aliased text vertically on a computer screen, each time the text is moved, it would take 1–2 seconds. Such a speed deficit is inadequate for the common multimedia computer uses. The present invention overcomes these disadvantages of the prior art.

U.S. Pat. No. 4,704,605, with a first listed inventor of Edelson, relates to a method and apparatus for providing anti-aliased edges in pixel-mapped computer graphics. The invention uses smoothing information consisting of a mixed value that indicates what percentage of the new color is to be displayed in a given pixel. The value of the percentage for the old color is derived by subtracting the indicated percentage from one hundred percent. The patent discloses three methods for encoding the mixed value for a pixel.

The background section of Edelson '605 describes an anti-aliasing scheme. In this scheme, encoding is used to define several mixed color values, typically 16 such color values, that are shadings between the available object colors and a given background color. With an eight-bit word allotted for each pixel, such a system can provide 15 object colors. Each of these colors would have 15 internally defined additional colors that are intermediate shades between the object colors and a background color. For instance, if the object is blue and the background was black, the display system will produce one of fifteen internally defined shades between blue and the given background color (black) required to simulate a pixel 15/16 covered with blue, down to 1/16 covered with blue.

Edelson '605 attempts to address one disadvantage of this prior art system: The fact that the anti-aliasing is only possible between the given object colors and one designated background color. If one object color crosses in front of another object color, the edge again appears jagged since no intermediate shades are defined for this combination of colors.

The first method of Edelson '605 allocates specific bits for color and mixed values. The second method encodes either mixing or color values in each pixel word. The subsequent pixel word is checked before deciding the proper treatment of a given pixel. The third method either encodes a color value or multiple mixed values in each pixel word. The mix information is then displayed as a set of sub-pixels.

U.S. Pat. No. 4,908,780, with a first listed inventor of Priem, is directed to anti-aliasing raster operations utilizing sub-pixel crossing information to control pixel shading. Anti-aliasing is performed by logically dividing each addressable frame buffer pixel into sixteen sub-pixels and generating a gray scale value for the displayed pixel that is a function of the number of sub-pixels crossed by a portion of a rendered image. The invented circuitry is part of the circuitry used for combining source and destination data which forms the displayed image: an anti-aliasing mask and filter, adder/subtractor logic, saturation logic and anti-aliasing logic.

In Priem '780, each addressable frame buffer pixel in the frame buffer memory is logically divided into a group of sixteen sub-pixels so that the entire screen appears to the CPU as if it had sixteen times more monochrome pixels than it actually has, and is four times larger in the X and Y directions than is actually present in the frame buffer. This is referred to in Priem '780 as "The High Resolution Monochrome Mode." The high resolution monochrome data supplied to the CPU is eventually written to the lower resolution pixel coordinate stored in the frame buffer memory. When performing the mapping between the sub-pixel coordinates addressed by the CPU and the pixel coordinates stored in memory, the sub-pixel data (that is, sixteen separate bits of information for each pixel on the video screen) is converted to an appropriated gray scale value so that the anti-aliased line has appropriately shaded pixels at the edges of the line.

U.S. Pat. No. 4,918,626, with a first listed inventor of Watkins describes a computer graphics priority system with anti-aliasing. Image data is composed from polygons to attain data for displays with the removal of hidden surfaces and smooth appearing edges. Defined polygons are tested for priority in a determined field of vision by scan conversion to specify individual picture elements or pixels. In general, the system of Watkins '626 is directed to a process or product for resolving priority between polygons contending for individual areas in a display. Priority is resolved by defining the edge where the planes of the two polygons intersect, then by applying a simple test of sign values after transforming the edge to the space of the display screen and determining the slope of such an edge.

U.S. Pat. No. 5,065,144, with a first listed inventor of Edelson is directed to an apparatus for expanding the number of shades a low-end graphics system may employ. The encoder of Edelson '144 converts explicitly represented pixel values from an image source into "mix-run" encoded representations thereof and stores them into the locations of a display memory. A display mechanism draws the resultant stored data from the display memory and interprets them in accordance with a mix-run encoding scheme originally disclosed in the Edelson '605 patent. As a consequence, the system of Edelson '144 is able to provide a wide range of color shades with only modest sized display and palette memories.

According to Edelson '144, a mix-run encoder converts the strictly pixel by pixel representation into a mix-run representation. To perform the conversion, the encoder searches through the source pixel words to find sequences that lend themselves to translation into a run of pixel words in the mix-run representation. In the mix-run representation, a run is characterized by a set of two values from which the various mixes and the run are to be computed. The mix-run representation contains a fraction from which the pixel value is to be computed by applying the fraction to two pixel values to be mixed. The mix-run representation typically represents the characteristic values in essentially a pixel by pixel manner as the two pixel words at the start of the run, and it may choose as the characteristic values those at the beginning and end of the source sequence that it translates into the run. The remaining, intervening pixel words in the run represent their pixel values as fractions, which must be applied to the two characteristic values for that run to arrive at the intended pixel values.

The encoder begins by inspecting a short sequence from the source pixel words that make-up an image. If the pixel values that the sequence represents can be adequately approximated as mixes of a common set of characteristic values, the encoder recognizes that sequence as one acceptable for translation, adds a further source pixel word to it, and determines whether the lengthened sequence is also acceptable. If so, the process continues. If not, it adopts the last acceptable sequence for translation into a run, and repeats the process with subsequent sequences.

U.S. Pat. No. 5,123,085, with a first listed inventor of Wells, is directed to a method and apparatus for rendering anti-aliased polygons so as to solve the hidden face problem. The pixels which comprise the edges and vertices of the polygon are first determined from the vertices which define the polygon. The alpha channel comprises either a sub pixel mask associated with each pixel which indicates the amount and sub pixel regions of coverage or a single value indicative of the percentage of coverage of a pixel. Furthermore, a z value indicative of the depth of each pixel is maintained. The pixels between the edge pixels of the polygon are then turned on, thereby filling the polygon. The pixels which comprise the polygon are then composited with the background pixels on a per pixel basis. The depth value of each pixel of the polygon (the z value) is used to determine the compositing equations to be used to composite each pixel of the polygon to the background.

U.S. Pat. No. 5,239,625, with a first listed inventor of Bogart, is directed to an apparatus and method for merging pages with high and low resolution items, such as photographic images coupled with text or graphics. An input image containing high resolution images and low resolution items are rasterized twice, once at a high resolution and once at a low resolution. The rasterized images are represented in compressed form using a run-code encoding technique.

During the low resolution rasterization, only the low resolution graphic elements are rasterized. At places in the image where there are no low resolution elements arbitrary data is substituted. This data is used as a place holder, but will otherwise be ignored. During the high resolution rasterization, only the high resolution graphic elements of the input image are rasterized. Data for the background is included so that the background will also be imaged. In places where their are low resolution image elements, a reserved intensity value is substituted.

The rasterized images are represented in compressed form using a run code encoding technique. In run-code encoding, continuous pixels along a single raster line having the same value are represented by one pixel and a repeat count pixel. Identical contiguous lines are represented by one line and a repeat line count.

U.S. Pat. No. 5,261,030, with a first listed inventor of Brooke describes a real time digital computer graphics processing method and apparatus for performing dynamic stairstepping anti-aliasing in systems employing dynamic images, such as visual simulation systems. Using Brooke '030, aliasing of digital computer images rendered in a simulation are reduced. Realtime pixel mixing is accomplished by processing each pixel of a digitally computer foreground image generated in real time with the corresponding pixel of a previously generated background image. The effect of the processing is to overlay the foreground image on the background image and cause the pixels on the periphery of each object rendered in the foreground image to be color blended with the corresponding pixels of the background image in such a manner as to soften the transition between the foreground and background images.

U.S. Pat. No. 5,295,235, with a first listed inventor of Newman, is directed to a polygon engine for rendering animation on a computer graphic display using a compressed data format. A display list of objects for the next frame is converted into a list of spans for each horizontal line of the display. The polygon engine converts the list spans for all objects into a set of run-length encoded bit map lines for the next frame. Conflicts between overlapping objects are resolved based on a depth value of the corresponding objects. Any remaining unspecified pixels are filled with a predetermined background color. The polygon engine updates the frame buffer to correspond to the set of run-length encoded bit map lines, preferably by comparing run-length encoded bit map lines for the next frame with those for the current frame, and writing only changed pixels into the frame buffer.

U.S. Pat. No. 5,303,334, with a first listed inventor of Snyder, is directed to an apparatus and method for rendering graphic images as bit maps. Following Snyder '334, the system consists of a single, relatively complex application specific integrated circuit (ASIC) connected high speed RAM. The primary function of the system is to render scanned or synthetic source images in black and white, gray, or color incorporating a fast, high quality screening method into the RIP's frame or banned buffer.

The system is used to improve raster imaging in many applications such as those which implement post script commands. Snyder '334 also describes the use of a mask in rendering text. The mask, which may be compressed (such as by using run-length encoding), is stored in uncompressed form in memory. The mask is then aligned bit by bit with the device buffer output as the character outline is scanned.

U.S. Pat. No. 5,369,739, with a first listed inventor of Akeley, is directed to an apparatus and method for generating point sample masks in a graphics display system. In Akeley '739, separate masks are generated for each edge of a polygon. These masks specify whether particular sub-sample points are within a half plane defined by an edge of the polygon. This is determined by examining the sign of vertical or horizontal distance metrics corresponding to those sample points. These separate masks are merged to form the final point sample mask. The final point sample mask contains information specifying whether particular sample points reside within the polygon.

U.S. Pat. No. 5,422,995, with a first listed inventor of Aoki, is directed to a method for decoding run-length encoded bit strings to increase the speed at which the bit strings may be written into bit mapped memory. The invention of Aoki '995 skips over a range of bit memory mapped addresses, reducing the number of write operations into the bit mapped memory.

U.S. Pat. No. 5,490,238, with a first listed inventor of Watkins describes an attribute blending system for composing computer graphic images from objects, such as polygons. Using Watkins '238, objects contending for pixel representation on a graphics display selectively are awarded a fractional area within a pixel on the basis of coarse calculations in the z dimension, aggregate demands of the objects, and blending techniques free of binary position resolutions. The area occupied by a polygon within a pixel is represented using a single number, which may variously be defined, for example, a value of 0 indicates no area is occupied within the pixel, while a value of 255 indicates full pixel coverage. Fine calculations in the z dimension for binary resolutions are avoided by blending techniques to provide anti-aliasing.

In general, the system of Watkins '238 involves a simplified processing technique for solving the hidden surface problem with anti-aliasing. The binary decision between pairs of contending polygons either is simplified or ignored. If the contending objects are widely spaced apart along the depth dimension, the pixel simply may be awarded to the nearest object. If the objects are relatively near, the individual demands on the pixel are determined. If the demands of objects can be accommodated within the capacity of the pixel, the resulting mixture is calculated. If the demands cannot be accommodated, the attributes of the objects are mixed or blended with consideration to the relative range of the objects.

U.S. Pat. No. 5,497,434, with a first listed inventor of Wilson, describes a method and apparatus for performing image data compression, such as in processing digital video images. The invention is directed to reducing the processing requirements for producing video images from a compressed data string. The decompression side of the system forms a sequence of arrays of pixel display values for driving a display device from a stream of compressed data containing compressed data codes. Each of the arrays of pixel display values represents a frame of a moving image. Pixel copy codes within the stream of compressed data trigger copying at one or more previously formed pixel display values to a current position within a sequence of positions within the array along which decompression progresses.

SUMMARY OF THE INVENTION

The present invention provides a method and apparatus for displaying anti-aliased text. Text on a computer display device typically contains "jaggy" edges (referred to as aliased text). The method of the present invention smoothes such "jaggy" edges by blending the edges of text into the color background the text is being rendered on.

The prior art method for rendering anti-alias text uses a technique known as super-sampling and reduction to create a mask or alpha channel through which the text is rendered. This involves drawing the text at a larger size (typically 4 times the size) and shrinking the image down to create an alpha channel mask which is used to blend a bitmap representation of the text into the background. An additional prior art method uses a technique known as outline vector extraction to draw anti-aliased text, to render anti-aliased text, or to create an alpha channel mask. The prior art approaches are inadequate for real time text rendering in multimedia applications. The first inadequacy is speed. Multimedia applications typically need to redraw full screen images in less than 1/10 of a second, the prior art methods take approximately 1–2 seconds to draw a full screen of text on a common computer. The second inadequacy is the excessive amount of memory required to store the image and alpha channel data.

Text contains long runs of solid white and black color. Consequently, the present invention utilizes run-length compression to encode the alpha channel data. Additionally, to avoid the need for an original bitmap, the present invention encodes the text color information into the mask data, creating a unique bitmap/mask hybrid. Due to the creation and storage of a hybrid bitmap/mask, the memory requirements are significantly decreased. Further, when rendering the text, the run length compression provides the ability to ignore/skip multiple pixels. Consequently, the run length compression provides the ability to avoid blending or mixing the background image with the source color for multiple pixels. In other words, the calculations regarding the mask/blend values are performed once, and the text may be rendered multiple times therefrom. As a result, the rendering speed is significantly increased.

BRIEF DESCRIPTION OF THE DRAWINGS

FIG. 9 is a computer system which the present invention may be implemented on.

DETAILED DESCRIPTION OF THE INVENTION

A method of anti-aliasing, rendering and storing text is described. In the following description, numerous, specific details, such as the use of byte based mask values, are set forth in order to provide a more thorough understanding of the present invention. It will be apparent, however, to one skilled in the art, that the present invention may be practiced without these specific details. In other instances, well known features have not been described in detail so as not to unnecessarily obscure the present invention.

Figure 1:
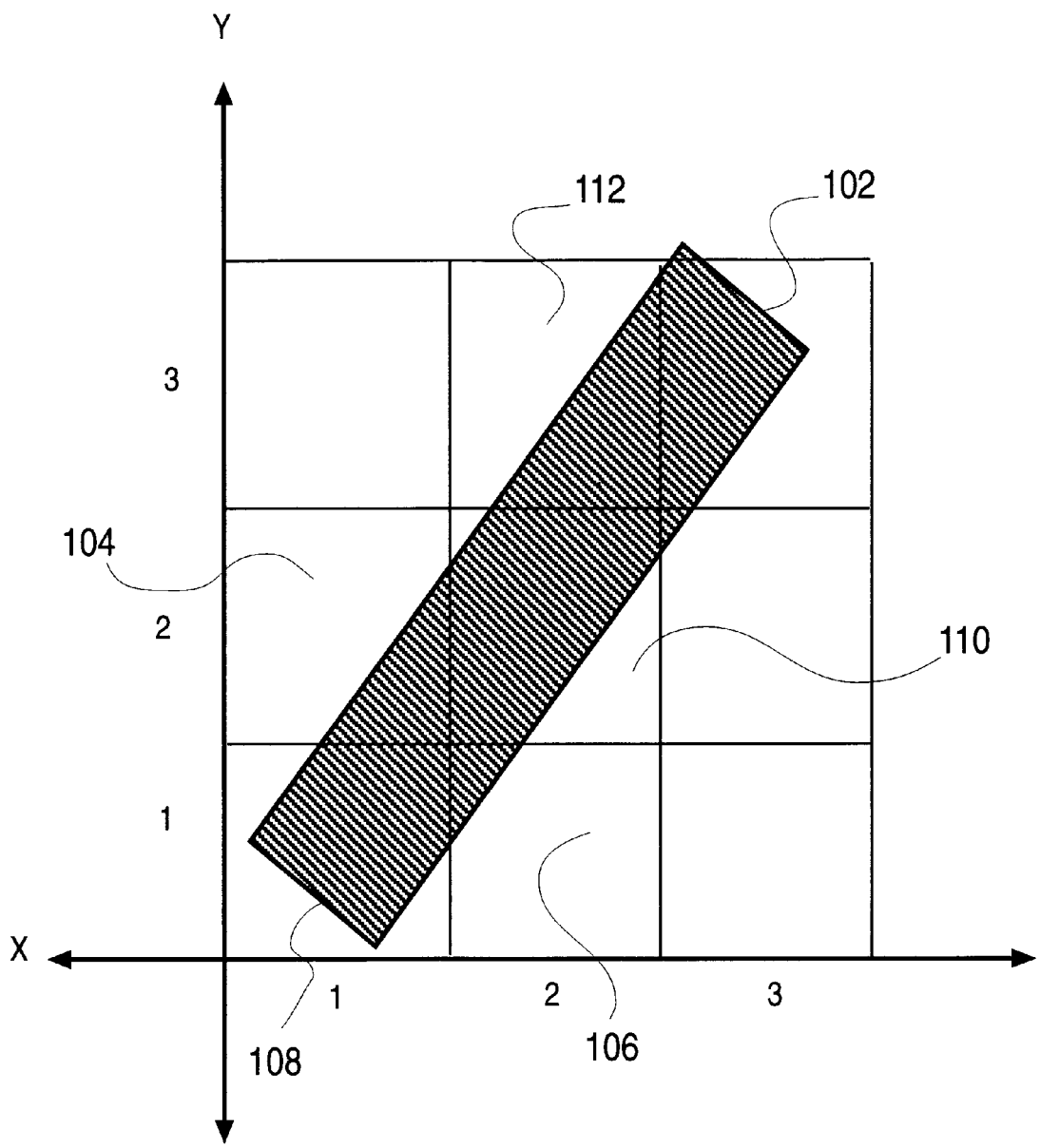
FIG. 1 is a 3 by 3 pixel array containing part of a text message or line.
Figure 1:
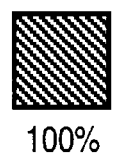
Figure 2:
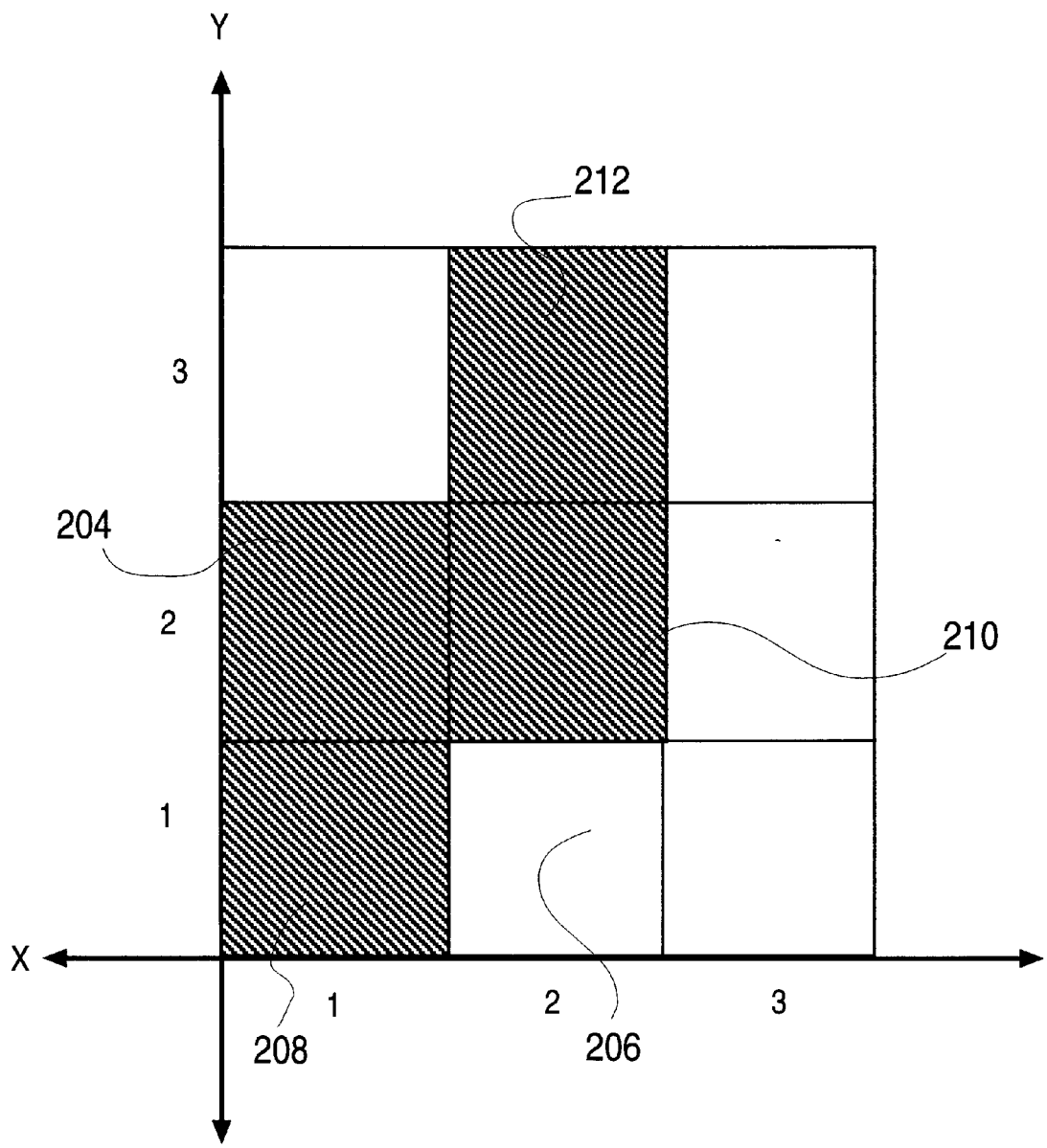
FIG. 2 is a 3 by 3 pixel array containing an aliased display of the line from FIG. 1.
Figure 2:
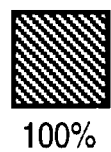
Figure 3:
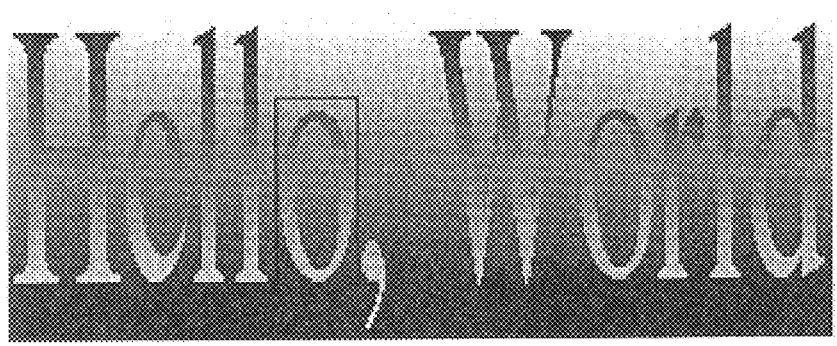
FIG. 3 is an aliased text message with one letter magnified to further demonstrate the effect of aliasing.
Figure 3:
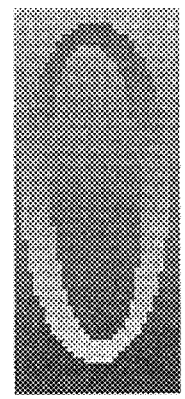
Figure 4:
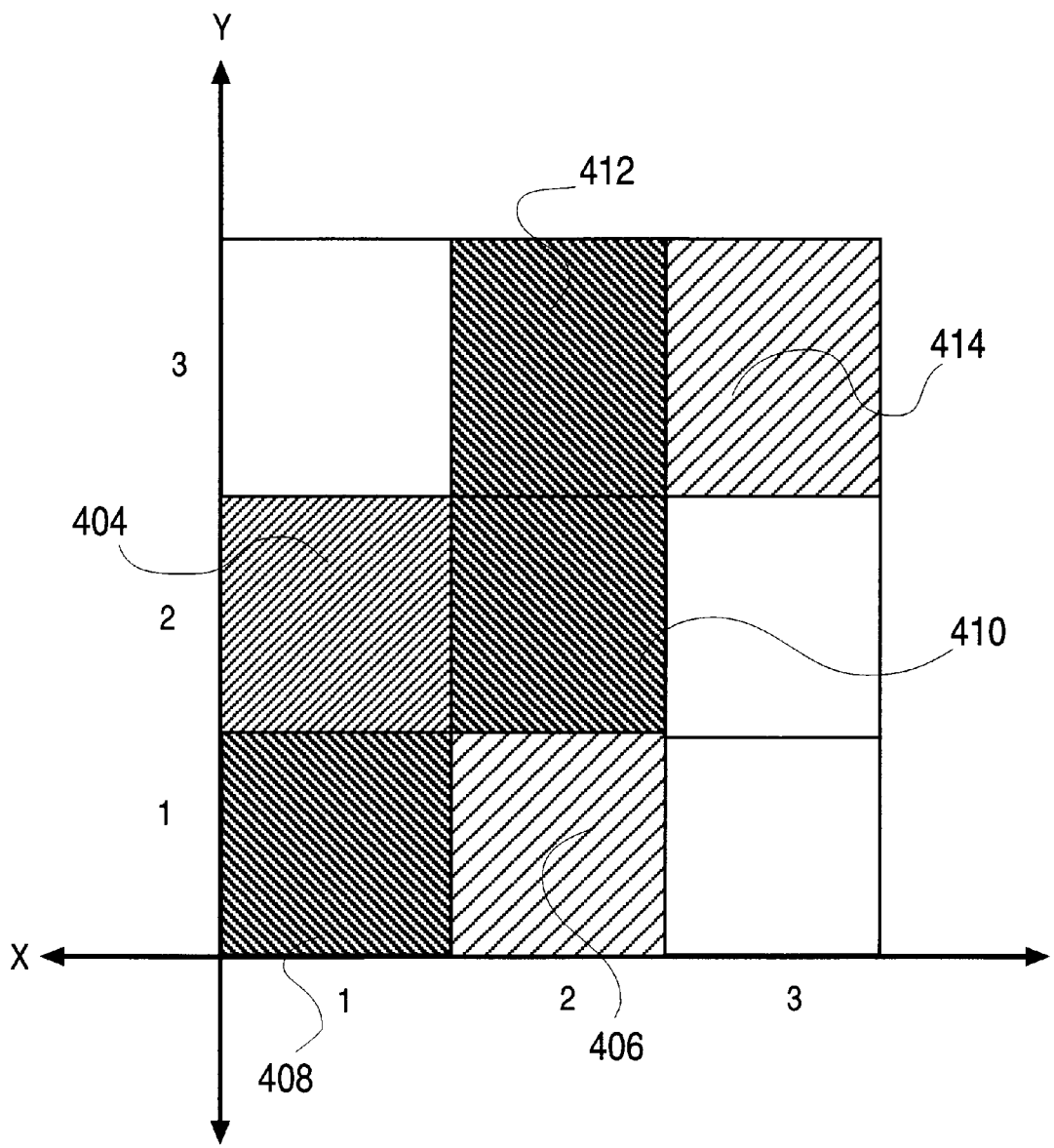
FIG. 4 is a 3 by 3 pixel array containing an anti-aliased display of the line from FIG. 1 and 2.
Figure 4:
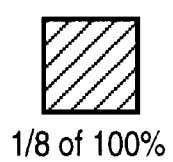
Figure 4:
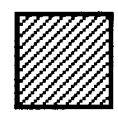
Figure 4:
Figure 5:
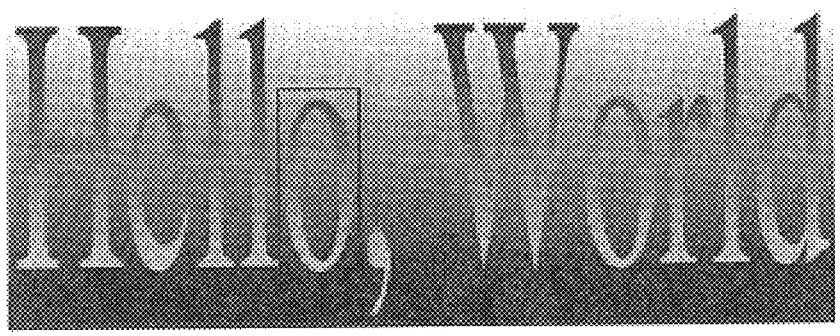
FIG. 5 is an anti-aliased text message with one letter magnified to further demonstrate the effect of anti-aliasing.
Figure 5:
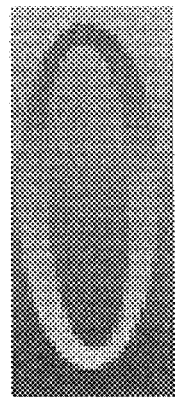
Figure 6:
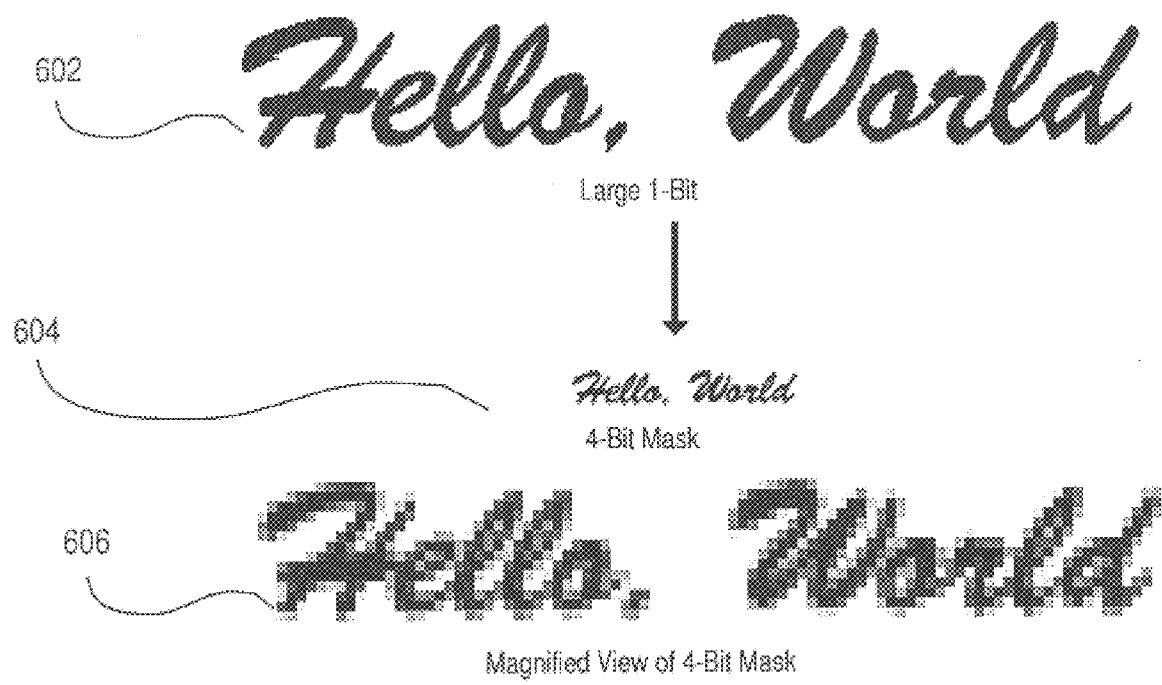
FIG. 6 demonstrates the prior art anti-aliasing method of super-sampling.
Figure 7:
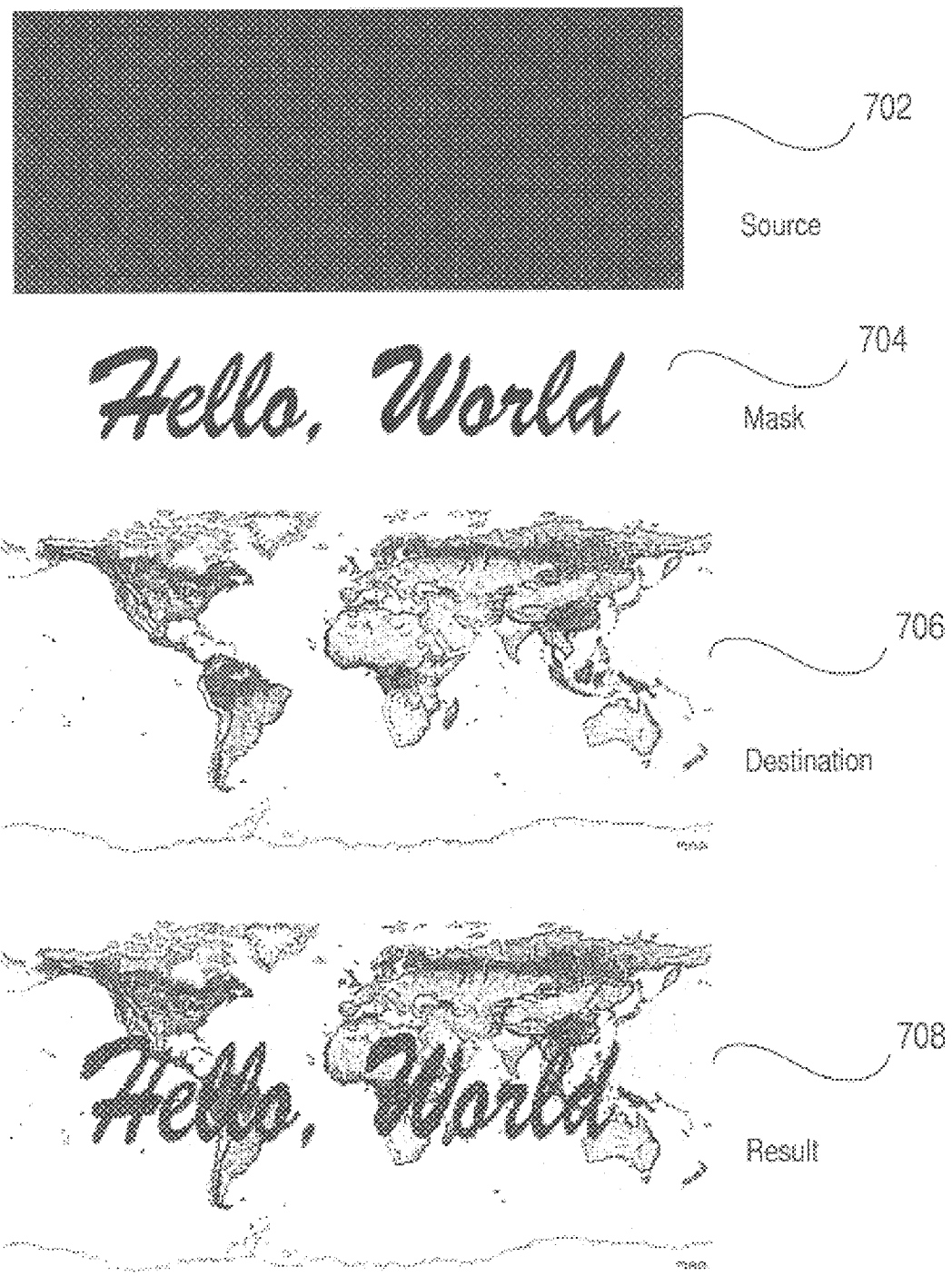
FIG. 7 demonstrates the prior art anti-aliasing method wherein a text message is placed on a destination image.
Figure 8:
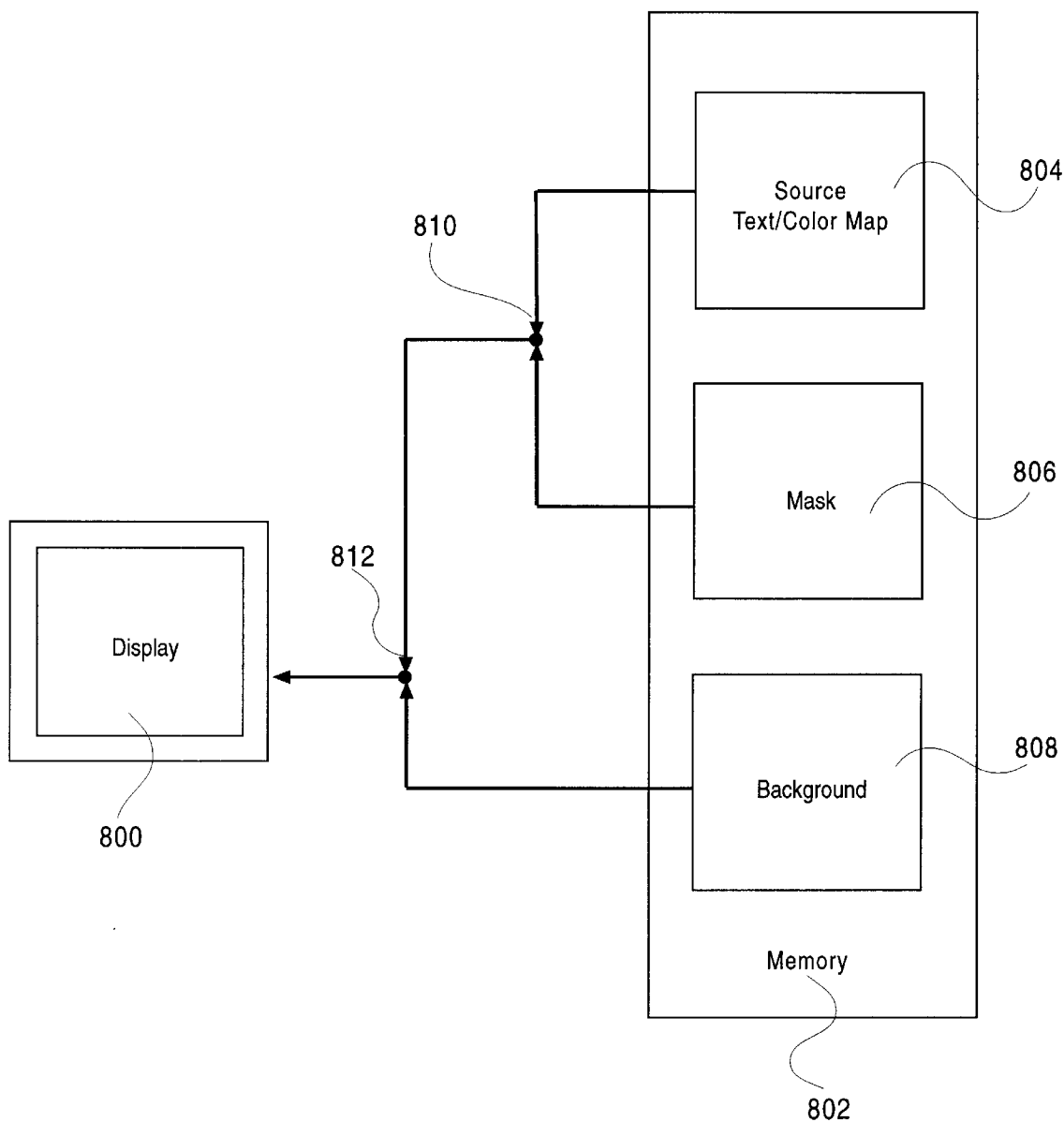
FIG. 8 demonstrates the memory requirements and method of the prior art.
Figure 9:
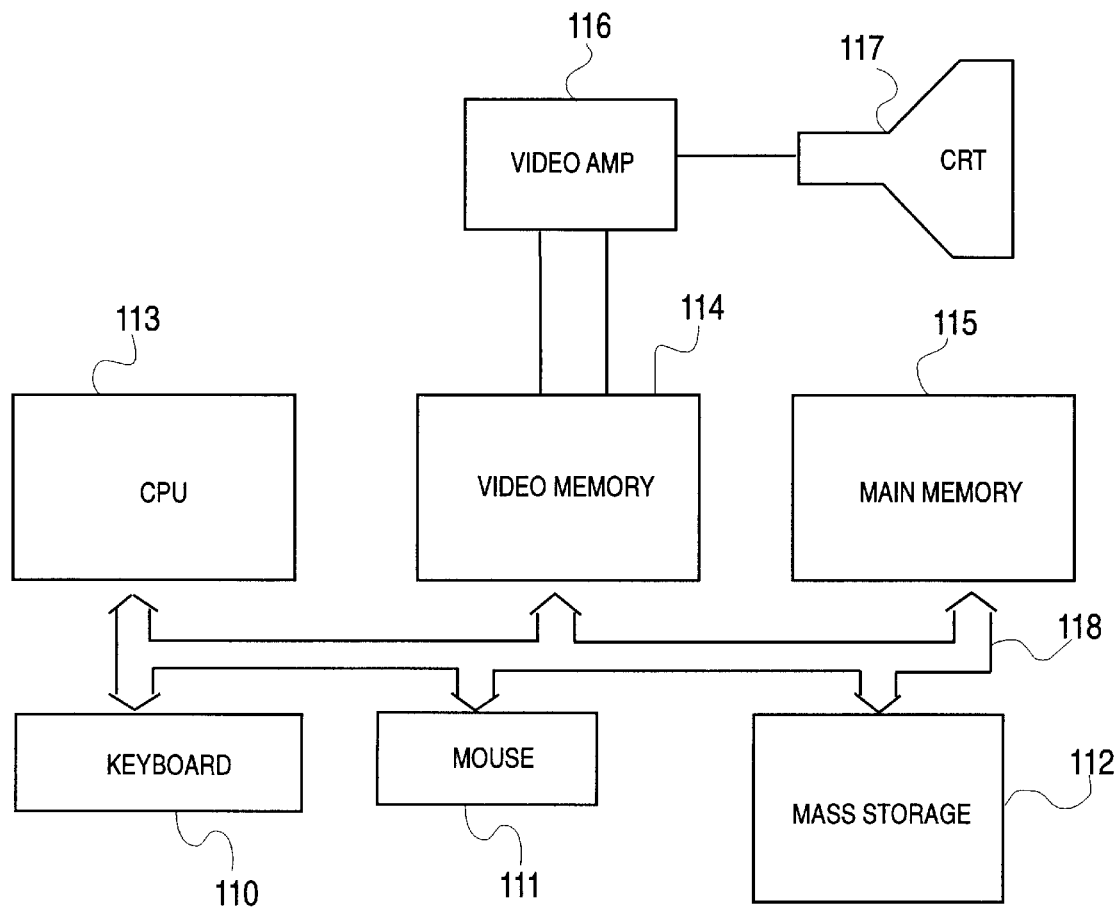

The present invention can be implemented on a general purpose computer such as illustrated in FIG. 9. A keyboard 910 and mouse 911 are coupled to a bidirectional system bus 918. The keyboard and mouse are for introducing user input to the computer system and communicating that user input to CPU 913. The computer system of FIG. 9 also includes a video memory 914, main memory 915 and mass storage 912, all coupled to bi-directional system bus 918 along with keyboard 910, mouse 911 and CPU 913. The mass storage 912 may include both fixed and removable media, such as magnetic, optical or magnetic optical storage systems or any other available mass storage technology. Bus 918 may contain, for example, 32 address lines for addressing video memory 914 or main memory 915. The system bus 918 also includes, for example, a 32-bit DATA bus for transferring DATA between and among the components, such as CPU 913, main memory 915, video memory 914 and mass storage 912. Alternatively, multiplex DATA/address lines may be used instead of separate DATA and address lines.

In the preferred embodiment of this invention, the CPU 913 is a 32-bit microprocessor manufactured by Motorola, such as the 680X0 processor or a microprocessor manufactured by Intel, such as the 80X86, or Pentium processor. However, any other suitable microprocessor or microcomputer may be utilized. Main memory 915 is comprised of dynamic random access memory (DRAM). Video memory 914 is a dual-ported video random access memory. One port of the video memory 914 is coupled to video amplifier 916. The video amplifier 916 is used to drive the cathode ray tube (CRT) raster monitor 917. Video amplifier 916 is well known in the art and may be implemented by any suitable means. This circuitry converts pixel DATA stored in video memory 914 to a raster signal suitable for use by monitor 917. Monitor 917 is a type of monitor suitable for displaying graphic images.

The computer system described above is for purposes of example only. The present invention may be implemented in any type of computer system or programming or processing environment.

The present invention creates a text alpha-channel mask, encodes the mask, and renders the text. For the step of creating a text/alpha-channel mask, any method may be used. However, in the preferred embodiment, a supersampling/reduction or an outline extraction method is used.

When text is displayed on a screen, it is often one solid color. As such, the source color or color map (which includes color and/or pattern information) does not contain a great deal of information. Due to this limited amount of data contained in the color map, the retention of a separate memory intensive data block for the color map and another memory intensive data block for the mask (as in the prior art) is not desirable. Consequently, the present invention combines the source color map and the mask into a hybrid mask. This combining of the mask and color map into a hybrid mask is referred to as encoding. Subsequent to the encoding, the encoded data is stored and the original mask and color map data blocks may be discarded. In this respect, only one data block is required to store the source and mask data. In addition, the raw text (stored in ASCII form), which consumes little memory may be stored to permit editing of the text. As previously indicated the prior art requires two separate and distinct uncompressed memory intensive bitmap data blocks to be stored: one data block for the color map; and one data block for the mask. Hence, the present invention's combination of the source and mask data into one data block in a compressed form reduces the memory requirements significantly.

During the encoding process, the data is compressed. The data may be compressed during encoding by examining the data for repeating sequences such as "100 100 100 100 100 100". The repeating sequence is encoded and then the number of times that the sequence repeats is encoded. Thus, in the above example, the sequence "100" would be encoded (or saved) and then the number of times it repeats "6". Such data compression is referred to as run length limited encoding or run length compression. As a result, the storage requirements of the prior art are further reduced. Instead of storing both a source and a mask, only a combined source/mask data block is stored, which in turn contains compressed data.

In the preferred embodiment of the present invention, the encoding of the data occurs in the background. For example, while the user is typing text, if the user does not perform any actions for approximately one second, the data is encoded and stored. Further, if the user is typing text in a word processor and closes the word processor quickly (before the data has been encoded and stored), the data is encoded and stored at that point in time. Once the encoded data has been stored, it does not need to be stored again.

After encoding, the present invention renders or draws the data on a display device. The rendering step of the present invention is accomplished more easily and more quickly than in the prior art. The scanlines of text to be displayed/rendered often contain runs of all foreground or all background. Consequently, the present invention provides for the optimization of the rendering process based on the noticed recurrence of these runs, resulting in an increase in speed.

Further, the encoded data is stored in binary form. Due to the fact that the repeating sequence and the number of times it repeats is stored, the data is in a type of code or has been encoded. In this respect the process of rendering such binary data may be referred to as the decoding and drawing of the data. The rendering/drawing of the data on the display device involves the decoding of the compressed data and the rendering/drawing of the text onto the background.

In addition to the encoding of the data using run length encoding, the actual sequences themselves contain encoded information regarding the pixel to be illuminated (e.g. the color and intensity of the pixel). As a result, the source image does not need to be scanned (which consumes time) during the rendering process. Further, during the drawing process, such information is analyzed and because the stored data is run length encoded, long runs of unchanged data can be indicated so that it does not have to be re-rendered or remixed with the background during the drawing process. In other words, if the same repeat sequence appears, no additional calculations need to be performed. The calculation determining the level of intensity and the color is only made once (which occurs during the encoding process). Such a calculation is then drawn on the screen and repeatedly drawn for the number of times the sequence repeats; the text information may be rendered numerous times without having to recalculate the mask or blend values as in the prior art. This results in an increase in speed and a significant advantage when scrolling or moving the text.

Further, if a blend of the source color and the destination pixel is to occur, the preferred embodiment uses a look-up table (discussed below) and does not perform the blend arithmetic each time a blend is to occur, resulting in an additional increase in speed.

ENCODING OF DATA

The encoding step of the present invention combines the source text/color map and the mask data (created earlier) into a hybrid mask. In order to provide for efficient decoding and drawing of the data, the data is encoded in an easily discernible manner. In addition, the data of the preferred embodiment of the invention is byte based (1 byte contains 8 bits; $2^8$=256) to accommodate multiple platforms. A byte based system enables the process/method to be used in a Macintosh® or a PC (Intel® type semiconductor-chip) environment. If the data is based on units larger than a byte, further steps may be required depending on the operating environment which is utilized. Additionally, in the preferred embodiment of the present invention, the mask is based on 4 bits. In other words the mask information for each pixel is contained in four (4) bits (16 distinct values/levels of blending ($2^4$)). Thus, all mask information will be represented by values between 0 and 15. The remaining bits of the byte (4) are utilized for encoding other information (custom defined data) to be discussed below.

ENCODING THE MASK

The mask contains all of the intensity levels of the pixels (including boundary/surrounding pixels). If the mask indicates that a pixel is to contain all source color and that no mix or blend with the destination is to occur (100% source), it is represented by a value of 15. Thus, if the mask indicates that no blending is to occur, but that the entire pixel is the source color, a 15 (or binary 1111) is stored in memory.

Figure 10:
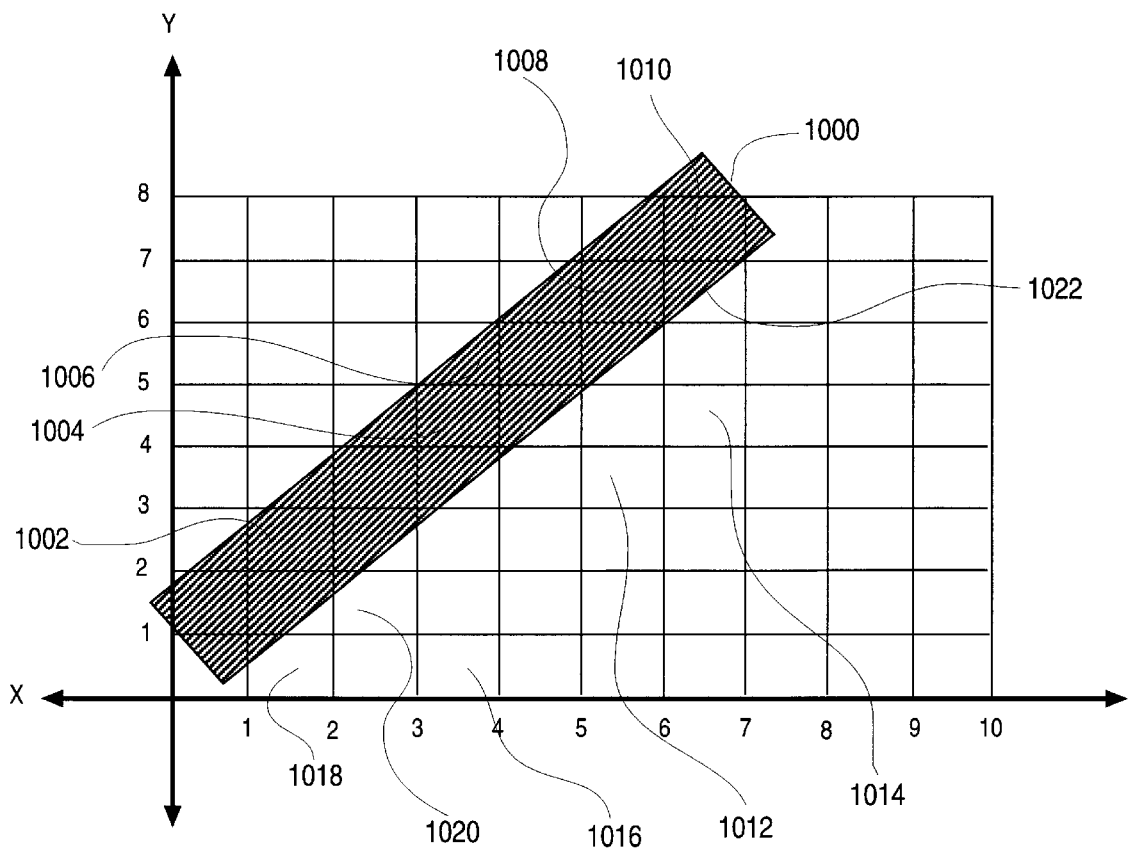
FIG. 10 is an 8 by 10 pixel array containing part of a text message or line.
Figure 10:

Referring to FIG. 10, line 1000 represents a line which the user desires to draw. Pixels 1002, 1004, 1006, 1008, and 1010 are completely enveloped by line 1000. Consequently, the mask for such pixels would indicate that no blending is to occur and that the entire pixel is the source color. As such, a value of 15 would be stored for those pixels. Similarly, if the pixel does not contain any source color but only the destination (100% destination), it is represented by a value of zero (0). In other words, if the text is not covering a certain pixel at all, and only the background will be seen in that pixel, a zero (0) (or binary 0000) is stored in memory. Referring to FIG. 10, pixels such as 1012, 1014, and 1016, are not within the desired line at all. Consequently, the mask for such pixels would indicate that only the background (100% destination) is to be displayed and a value of 0 would be stored for those pixels.

As indicated above, text characters are often displayed in one color. Further, when displaying text characters, numerous consecutive pixels often contain the same value. As such, long sequences of repeating patterns of 1s (ones) or 0s (zeros) from the 100% source and 100% destination pixels, are present. Such repeating patterns are easily compressed using run length encoding. As described above, during run-length encoding, the repeating pattern is stored, and then the number of times that sequence repeats is stored. In the preferred embodiment of the present invention, the storage of data is byte based. Therefore, the maximum run count which can be encoded is 255 (8 bits provides for $2^8$ values; a total of 256 or values from 0 to 255). As a result, consecutive runs may be encoded back to back in order to accommodate a single run greater than 255 pixels.

With respect to the present invention, whenever a fifteen (15) or a zero (0) value is stored, the subsequent byte contains a run value. Therefore, whenever the mask indicates a pixel contains 100% source or 100% destination, a fifteen (15) or a zero (0) is encoded followed by the number of times that value repeats. In other words, whenever an entire pixel is either 100% source color or 100% destination, the encoded mask value (0 or 15) is followed by the number of consecutive pixels which are also 100% source or 100% destination. In this respect, data is compressed using run-length encoding.

If a pixel contains a mix of the source color and the destination, it is represented by a value between a binary 1 and 14. In other words, if the mask indicates that a percentage of less than 100% of the source color is to be displayed, a value between a binary 1 (0001) and a binary 14 (1110) is encoded. Thus, if the mask indicates that 75% of the pixel is to be the source color, a value of binary 11 (1011) is encoded (an 11 represents 12/16ths which is 75%). Similarly, if the mask indicates that 25% of the pixel is to be the source color, a value of binary 3 (0011) is encoded (a 3 represents 4/16ths which is 25%). Thus, sixteen different intensities or percentages are available for every one color (0, 15, and 1–14).

Referring to FIG. 10, pixels 1018, 1020, and 1022 are not completely within, nor are they completely outside of line 1000. Consequently, the mask will indicate a certain intensity level or that some percentage of the pixel will retain the source color and such value will then be encoded to a value between binary 1 and binary 14. For example, approximately 50% of pixel 1022 is within line 1000. As such, the mask would indicate a 50% value, and a binary 7 (0111) would be encoded (a 7 represents 8/16ths which is 50%). In the same respect, approximately ¼ or 25% of pixel 1018 is within line 1000. As such, the mask would indicate a 25% value, and a binary 3 (0011) would be encoded (a 3 represents 4/16ths which is 25%).

ENCODING CUSTOM INFORMATION/COLOR MAP

An additional aspect of the encoding stage of the present invention is that of indicating/encoding custom information including the source color/pattern/image. Due to the fact that the data is byte based, there is a possibility of 256 total values which may be stored. Sixteen (16) of those values are used for encoding the mask value. Consequently, 240 values (256–16) are left which may be utilized for custom data. This custom information/data can include anything the user desires to encode. For example, the various values encoded may represent a color value, a reference to a color palette index, or a reference to a map containing previously described colors. As such, to represent the color (to encode a color) to which the intensities of the mask are applied, a value greater than a binary 15, or a value between a binary 16 and binary 255 is encoded. In the preferred embodiment of the present invention, to indicate a color value, a hexadecimal one-f (1Fh) is encoded.

In the preferred embodiment, following the encoding of a 1Fh (or a value representing a color), the subsequent three (3) bytes specify the red, green, and blue (RGB) color components. As such, each time the source color changes, a 1Fh (a byte greater than 15) is encoded followed by the three defining RGB bytes. The three defining RGB bytes are obtained by reference to a color block which is drawn (using any text drawing routine) in the source color large enough to accommodate all possible pixels that may need to reference that color. In this manner, no searching is performed to determine the color of a particular pixel. Subsequent to the encoding of the RGB values, the color block is no longer used and may be discarded. By encoding the source color in this manner, one can always determine the current source color for a pixel by looking to this previously encoded color map value.

ENCODING THE END OF A LINE

Each row of pixels on a screen display may be viewed as a line. Further, to display an image, the display device scans each line, row by row, illuminating the appropriate pixels. In this respect, each row of pixels on a screen is referred to as a scanline. When encoding the data, following the encoding of interesting data for a particular scanline, a data sequence representing the end of the line is encoded. Interesting data is defined as that information which would be encoded with values between 1 and 15. Thus, interesting data represents pixels that contain 100% source or varying levels of intensity. In other words, when the scanline contains no pixels other than 100% background, the end of the line is encoded. To represent the end of a scanline, a binary zero (0000) is encoded followed by an additional zero.

COMPREHENSIVE ENCODING

As demonstrated above, the mask value (0–15), custom data (including the color map) (16 or higher), and the end of line notation (0 followed by a 0) are all encoded together into one comprehensive data block. The source color is encoded, followed by a series of mask values. When the source color changes, a new color is encoded and the mask value encoding continues. During such encoding, if the end of a scanline is present, such a notation is encoded. Further, if a zero is encoded (representing 100% destination), and the run count extends to the end of the scan line, instead of encoding the run count, another zero is encoded which represents the end of the scan line. In this manner, less memory is consumed.

The process is repeated until the entire text message has been encoded. As a result of the encoding, there is as much as a 75% reduction in the memory requirements over the prior art.

RENDERING THE DATA

The prior art methods of rendering the data are slow. The present invention overcomes this speed deficit.

Information Provided by the Computer System

When rendering/drawing an image or text to a display device, three objects of information necessary for the rendering are provided: (1) the encoded data as described above; (2) a sub-area of the encoded data which is to be rendered; and (3) the position on the screen where the data is to be rendered.

The sub-area of encoded data may include the entire text message/image or can include a portion of the text message/image. When a portion is provided by the computer system (and not the entire text message), it is provided to permit a portion of the text message to be rendered or updated to the display device. An example of when a portion needs to be rendered/updated occurs when a display window is covering part of the text message and the display window is closed or moved. In this situation, only the portion of the text message that was previously covered by the display window needs to be rendered. Therefore, the encoded data for the uncovered portion of the recently closed window is provided by the computer system. On the other hand, if the text has moved or has been changed, the computer system will signify that all of the encoded data is to be rendered.

Figure 13:
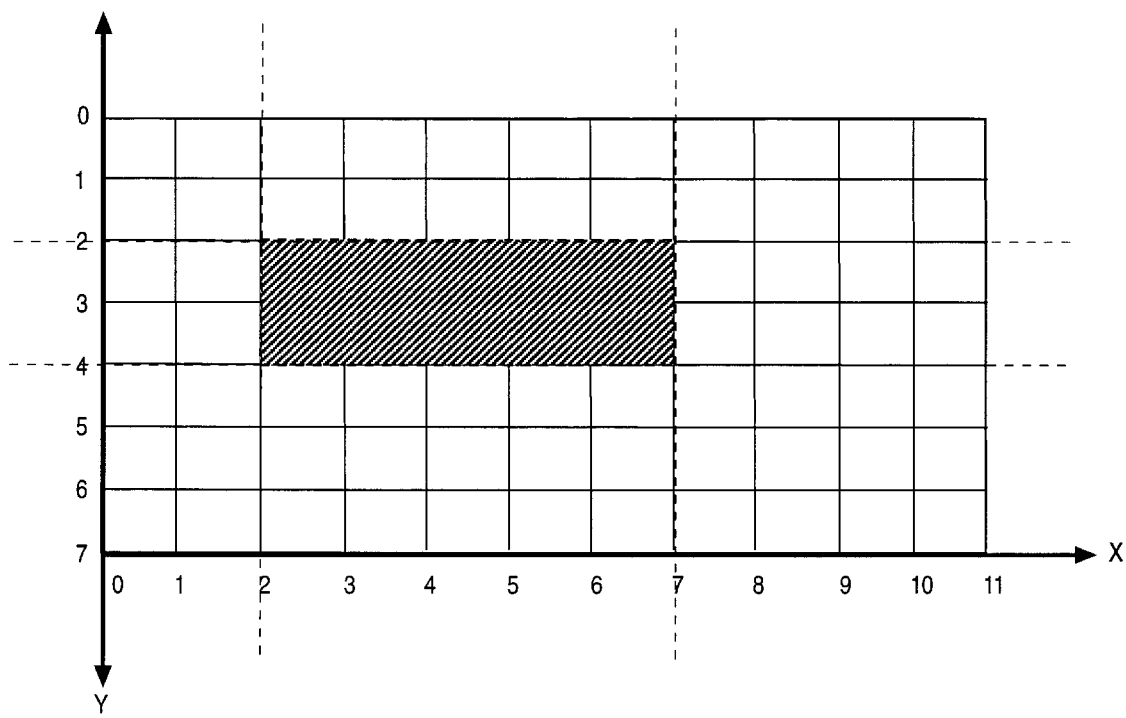
FIG. 13 demonstrates a display device with a window that is to be rendered with the encoded data.
Figure 13:

Additionally, it is necessary to determine where the encoded data is to be rendered on the display device. Consequently, the position on the screen where the data is to be rendered is provided by the computer system (object of information (3) above). The encoded data is rendered to a specific location on the screen. For example, if the text message is scrolling vertically down the screen, the computer system will provide the pixel location information each time the text message is moved. The pixel location where the encoded data is to be rendered may be provided in the form of x-y coordinates. Referring to FIG. 13, the encoded data is to be rendered in rectangle 1302. The top of the text message rectangle 1310 is the minimum y-value (a value of two (2)). The bottom of the text message rectangle 1308 is the maximum y-value (a value of four (4)). The right side of the text message rectangle 1306 is the maximum x-value (a value of seven (7)). The left side of the text message rectangle 1304 is the minimum x-value (a value of two (2)). These maximum and minimum x and y values (1304, 1306, 1308, and 1310) are provided by the computer system. In other words, the computer system provides the first scan line and the last scan line of the display device (max-y and min-y). Further, the computer system provides which part of the scanline is to be rendered (max-x and min-x). The providing of these values permits the rendering of the encoded data to a specific location on the display device.

Rendering the Text Message in General

When rendering data, the encoded data block is examined one byte at a time. The actual rendering/drawing of the encoded data to the display device may not start with the first byte of the encoded data. For example, if the entire text message/image is not going to be drawn, the portion of the encoded data which is to be drawn may be present in the middle of the encoded data. In this respect, the first scanline to be drawn would be located in the middle of the encoded data block.

The encoded data is searched byte by byte until the first scanline to be drawn/displayed is located. To perform the searching, the encoded data is scanned for the end of a line notation (a zero (0) followed by a zero (0)). Each end of a line notation indicates the end of a scanline. In this respect, the encoded scanlines are skipped until the first scanline to be rendered is reached.

Figure 14:
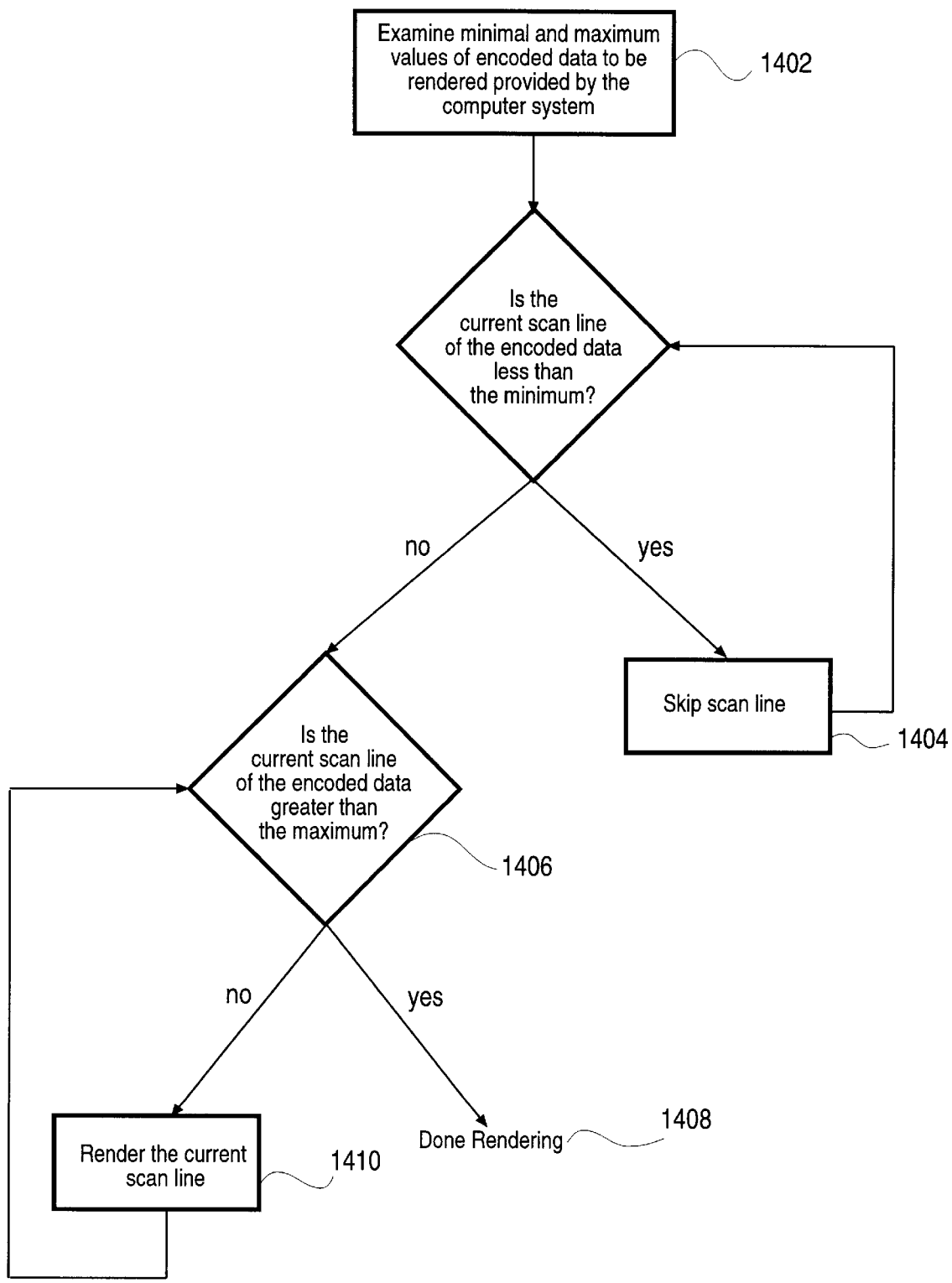
FIG. 14 is a flow chart of the rendering process of the present invention.

Referring to FIG. 14, the maximum and minimum values for the portion of the encoded data to be rendered are examined 1402. When the current scan line of the encoded data is less than the minimum, it is outside of the portion which is to be rendered. As a result, that scanline is skipped in the encoded data 1404. However, when the current scanline is greater than the minimum, it may be within the portion to be rendered. A determination is made as to whether or not the current scanline is greater than the maximum 1406. If the current scanline is greater than the maximum, it is outside of the portion to be rendered, and the rendering process is complete 1408. On the other hand, if the current scanline is less than the maximum, it is within the area to be rendered and the rendering process continues 1410. In other words, a determination is made as to whether the scan line is inside or outside of the area to be rendered. If the scanline is outside of the area, it is skipped. If the scanline is inside of the area, it is rendered and the process repeats with the next line until the end of the encoded data is reached.

Rendering Scanlines

Figure 11:
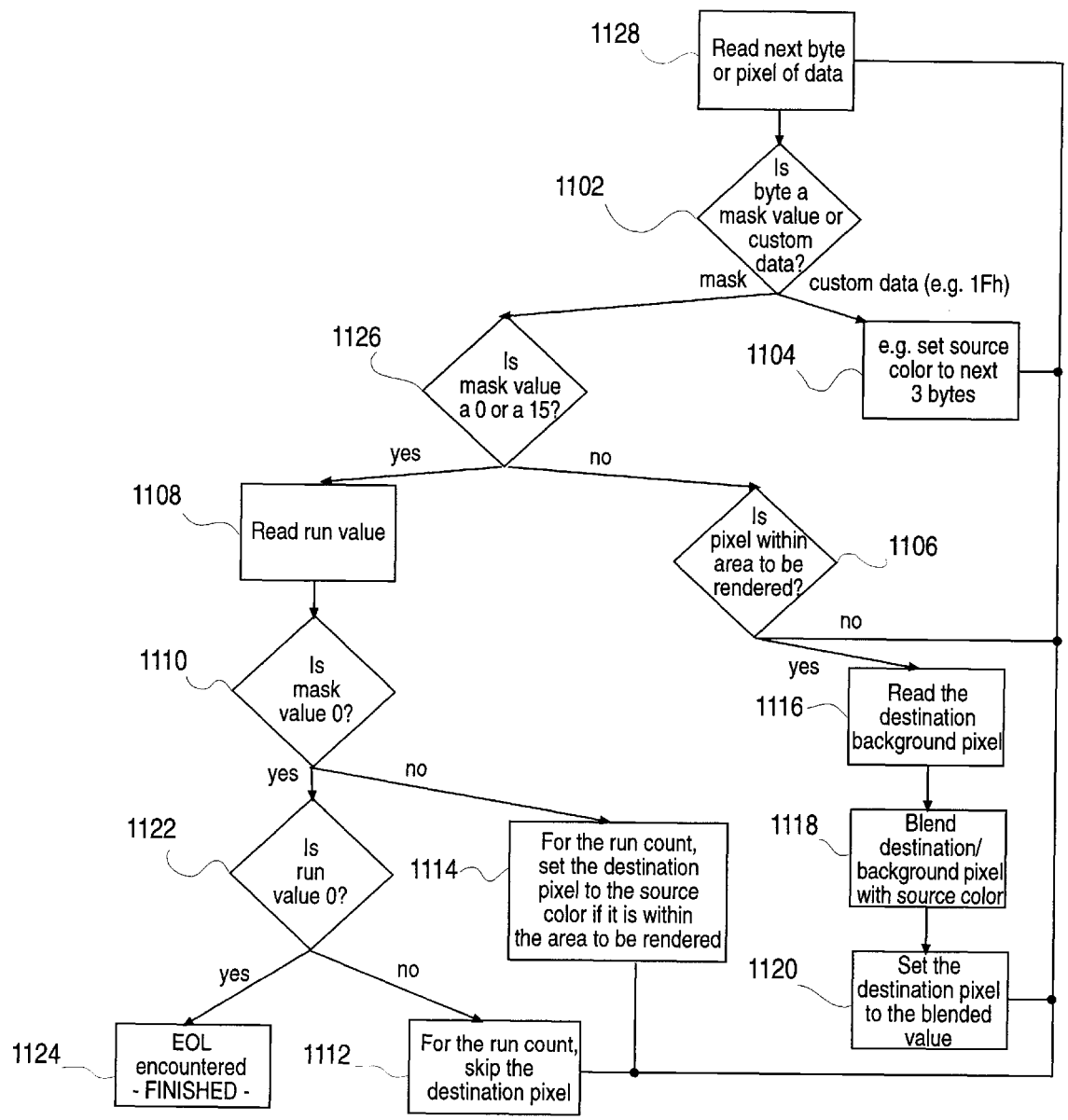
FIG. 11 is a flow chart of the scanline rendering process of the present invention.

The rendering of a scanline, the process of 1410, is further illustrated in FIG. 11. Having reached the first scanline where rendering will occur, the first pixel that is to be rendered must be located. A determination is first made as to whether or not the byte contains a mask value (0–15) or custom data (greater than 15) 1102. If the encoded byte is that of custom data, further actions may be taken. If the custom data is that of a color, for example a 1Fh, the source color for the display is set to the subsequent three (3) bytes 1104. In this respect, for any subsequent mask value, the custom data (source color) has been determined and may be easily referenced/used. If the encoded byte is not that of custom data, the pixel may be rendered.

Rendering the pixel

The rendering process makes a determination as to whether the mask value is 100% source (15) or 100% destination (0) 1126. During the encoding process, whenever a mask value of 0 or 15 was encoded, the subsequent encoded byte was that of the run count/value for the number of pixels which maintained the same value. Consequently, after a mask value of 0 or 15 is read, the run value is read 1108.

If the mask value was a zero, the next byte is examined to determine if another zero has been encoded 1122. If an additional zero has been encoded, then the end of the scanline has been reached 1124, and the rendering for the current scanline is complete. Upon completion of a scanline, the process continues with the original determination of whether the next scanline is within the area to be rendered (see FIG. 14 at 1406).

On the other hand, if an additional zero has not been encoded (the end of the scanline has not been reached), then for the number of pixels in the run count, the pixel displayed on the screen is skipped 1112. In other words, the background on which the text character is being placed remains unchanged for every zero mask value encountered. As such, no blending of the source color with the background color occurs, and the background pixels to be displayed are left unchanged.

To summarize the above steps: if the mask value is a zero (0), then either the end of the scanline has been reached or a 100% destination pixel is present. If the end of the scanline has been reached the process is complete. Otherwise, for the run count, the pixels are skipped.

If the mask value is not a zero, but is a 15, then for the number of pixels in the run count, the display pixel is set to the source color 1114 as long as the destination pixel is within the area to be rendered. In other words, the text character is consuming an entire pixel and as such, none of the background image is to be displayed in that pixel (the pixel will be 100% source color). Further, none of the background image is to be displayed for the number of pixels in the run count (as long as the run does not extend beyond the rendering area). As a result, no blending is to occur and the number of pixels indicated by the run count are displayed in the source color.

Due to the fact that no blending is to occur when rendering pixels with either 100% source or 100% destination (the pixels are either skipped (100% destination) or filled with the source color (100% source)), the rendering process does not require repetitive calculations and occurs at an efficient and increased level of speed over the prior art.

If the encoded byte is not a zero (0) or a fifteen (15), then the encoded byte contains a mask value between one (1) and fourteen (14). Such an encoding indicates that a certain percentage of the pixel will be the source color and another percentage of the pixel will be the destination. In other words, the percentages/values represent a blend of the source color and the background/destination color. A check is made as to whether the pixel is within the area to be rendered 1106. If it is within the area to be rendered, the color of the background/destination pixel is determined. In this manner, the destination color is first read 1116, and then blended according to the value of the mask 1118 (a value/intensity mix of between 1 and 14). The pixel on the display device is then set to the value of the blended color.

Figure 15:
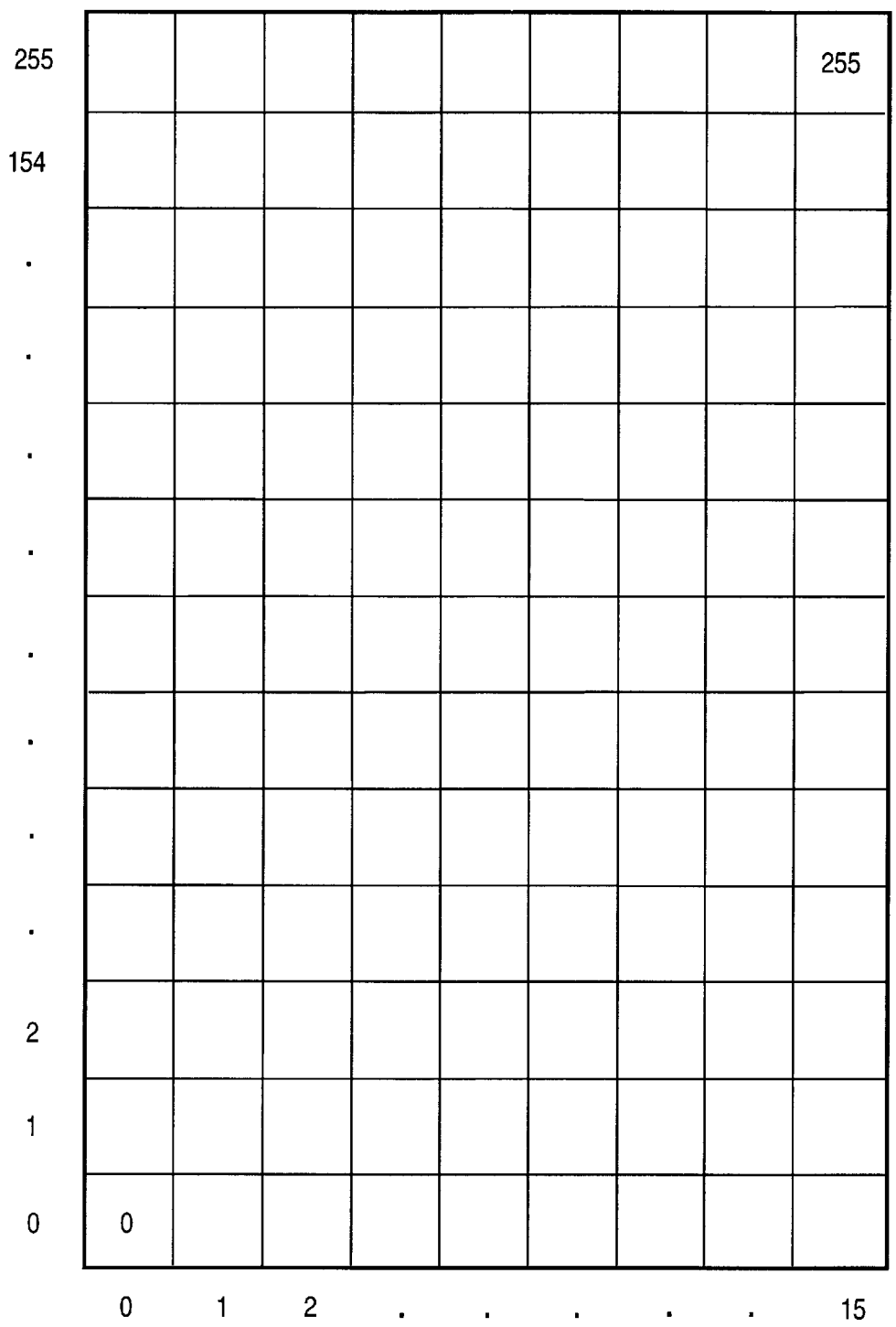
FIG. 15 is a two-way look-up table for the storage of blend values.

In the preferred embodiment of the present invention the blending utilizes Red-Green-Blue (RGB) look-up tables to determine the resulting blended color to be displayed (giving rise to an increase in speed). A two-way table is created which is 256 rows by 16 columns as illustrated in FIG. 15. The sixteen columns represent the blend values (0–15). The 256 rows represent difference values between the source and the destination. In other words, if the red color component for the source is 155, and the red color component for the destination is 5, then the appropriate row would be row 150 (155–5). In a similar respect, if the red color component for the source is 5, and the red color component for the destination is 155, the appropriate row would also be row 150 (155–5). In this manner, if the source is greater than the destination, then the destination is subtracted from the source to determine the appropriate row. Similarly, if the destination is greater than the source, then the source is subtracted from the destination to determine the appropriate row. Continuing with this example, if the appropriate row is row 150 and the encoded blend value is thirteen, then the corresponding value to be looked up in the table is located in row 150, column 13.

As set forth in FIG. 15, the value stored at the location of row zero (0) (100% destination) and column zero (0) is zero because no blending is to occur. Similarly, the value in column 15 (representing 100% source) when the difference is 255, is 255. The other stored intermediate values in the table are scaled appropriately.

The final blend value to be illuminated is obtained by adding either the value of the source or the value of the destination to the value obtained from the look-up table. If the value of the source is greater than the value of the destination, then the destination value is added to the look-up value. On the other hand, if the value of the destination is greater than the value of the source, then the source value is added to the look-up value. Thus, values are determined from the look-up table according to the following equations:

--- if SOURCE (S) > DESTINATION (D),
 then the value to be illuminated (V) is
  D + lookup(S-D, BLEND)
if DESTINATION (D) > SOURCE (S)
 then the value to be illuminated (V) is
  S + lookup(D-S, BLEND)

---

The two-way look-up is performed three times for each pixel; one look-up for each color component (red, green, and blue). The ability to look up the value in a table eliminates the need to calculate a blend value (by time consuming multiplication and division for every color component) in real time. As a result, the rendering speed is increased.

In an unoptimized blending implementation of the present invention, the difference between the source and destination is multiplied with the blend value (which maintains values between 1 and 16) and the total is divided by sixteen (16). The divided result is then added to the destination if the source was greater than the destination, or added to the source if the destination was greater than the source. Thus, the unoptimized blending occurs according to the following equations:

$$\text{if SOURCE}(S) > \text{DESTINATION}(D),$$
$$\text{then the value to be illuminated } (V) \text{ is}$$
$$D + \frac{(S-D)*\text{BLEND}}{16}$$
$$\text{if DESTINATION}(D) > \text{SOURCE}(S),$$
$$\text{then the value to be illuminated } (V) \text{ is}$$
$$S + \frac{(D-S)*\text{BLEND}}{16}$$

This method is not optimized due to the multiplication and division that must take place in order to determine the blend value of the pixel to be illuminated. Consequently, in the preferred embodiment, the optimized blend method which utilizes look-up tables is used.

Figure 12A:
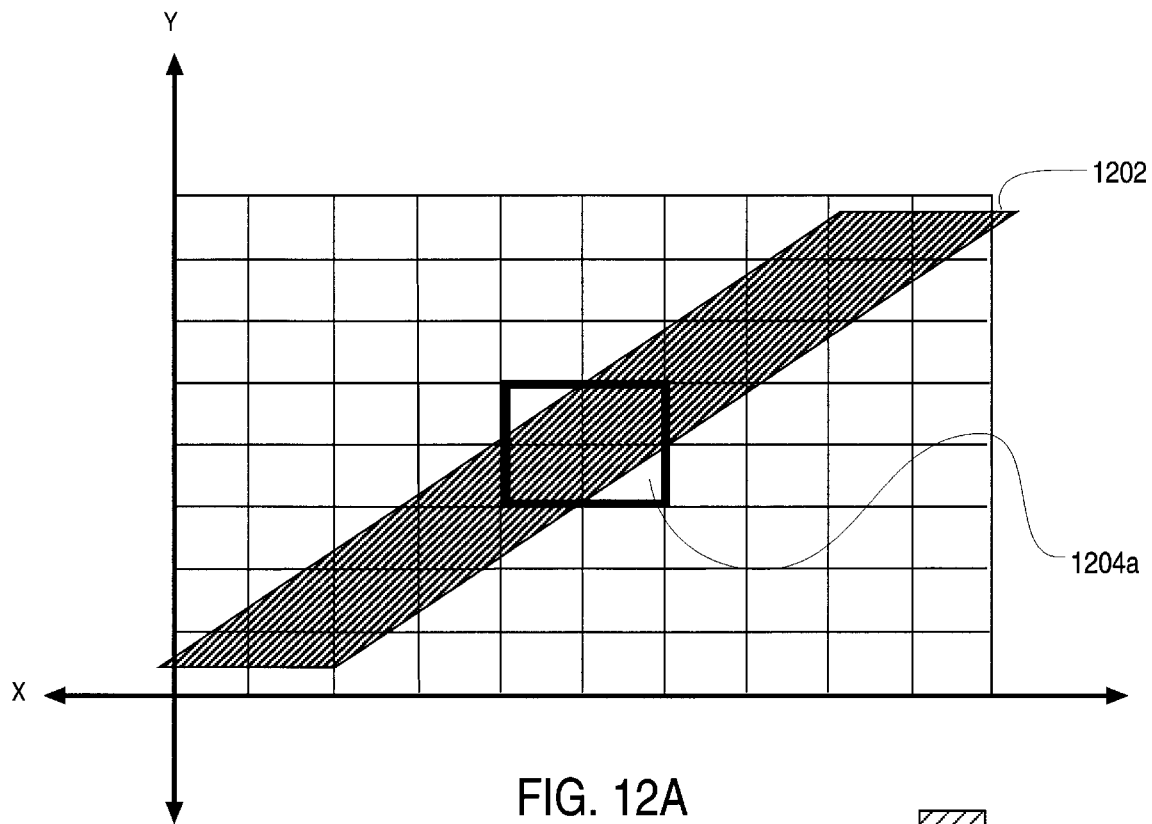
FIG. 12a is a pixel array containing part of a text message or line.

Referring to FIG. 12a, pixel 1204a is filled by approximately 50% of line 1202. As such, the mask value would likely be a binary 7 (7 is ⁸⁄₁₆ths or 50% of the pixel).

Figure 12B:
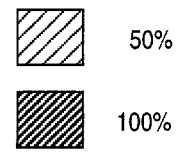
FIG. 12b is an enlarged section of FIG. 12a demonstrating anti-aliasing.

Consequently, the first four bits read are 0111. Since the value is between 1 and 14, when rendering pixel 1204, the background of pixel 1204 would be read (step 1116 of FIG. 11). This background color would be blended with the source color such that the color of the pixel to be displayed is a combination of 50% source and 50% destination (the resulting blend value is calculated by use of the two-way look up table). In FIG. 12*a*, the source color of pixel 1204*a* is black and the destination color is white. Consequently, a blend of the black (source color) and white (destination color) results in a shade of gray. The pixel on the display screen is then set to the values of the blended color as obtained/calculated from the two-way look-up table (step 1120 of FIG. 11). In the above example, the blended pixel which is actually displayed is demonstrated in FIG. 12*b* by pixel 1204*b*. After the pixel has been displayed, the subsequent byte is read and the process continues until the end of the scanline has been reached.

Advantages

The above sequence of rendering steps permit a significant increase in speed over the prior art. Due to the fact that the combined mask and source image have been stored (which includes the blend calculations that are to be performed) the rendering may be performed in real time. Additionally, the storage of a two-way look-up table further increases the speed. Such real time rendering permits text messages which do not remain stationary to be displayed in anti-aliased form. In other words, anti-aliased text messages may be scrolled or moved and can still be displayed in real time efficiently. The prior art methods were unable to satisfactorily/efficiently render such anti-aliased text in real time.

Due to such increased speed, words which previously took approximately ½ of a second to ¾ of a second to draw on the screen, may be rendered by the present invention 50 to 60 times per second. Therefore, the result is up to a 2000% increase in speed, a significant advantage of the present invention.

We claim:

1. A method for displaying a text message on a display device comprising the steps of:

creating a mask for said text message;

encoding said mask and custom data into an encoded hybrid data block;

said encoding said mask step comprising:
 encoding a first number if said mask indicates that a pixel contains only a source color;
 encoding a second number if said mask indicates that a pixel contains only background information;
 encoding an intensity value if said mask indicates that a pixel contains blend of a source color and background information;
 encoding said second number twice if said mask indicates that an end of a scanline has been reached;

rendering said encoded mask and custom data.

2. The method of claim 1 wherein the step of creating a mask further comprises the steps of:

drawing said text message in an enlarged form; and shrinking said enlarged text message to create a mask.

3. The method of claim 1 wherein the step of creating a mask further comprises the steps of:

extracting outline information from said text message;

calculating intensity values of pixels based on the outline information; and creating a mask based on the intensity values.

4. The method of claim 1 wherein the encoding of a first number and the encoding of a second number steps are followed by an encoding of a number of times said source color or said background color repeats.

5. The method of claim 4 wherein the rendering step further comprises the steps of:

reading a portion of the encoded data;

determining if the encoded data is a mask or custom data;

reading the run value if the encoded data is the first number or the second number;

setting the run value number of destination pixels to a source color if the encoded data value is the first number;

skipping the run value number of destination pixels if the encoded data value is the second number and is not the end of a scanline;

if the encoded data is a blend value then
 reading the destination pixel;
 blending the destination pixel with a source color to a blended color; and
 setting the destination pixel to the blended color.

6. The method of claim 5 wherein the blending step further comprises:

looking up a first value for a red color component;

adding the first value to a first source value if a first destination value is greater than the first source value;

adding the first value to the first destination value if the first source value is greater than the first destination value;

looking up a second value for a green color component;

adding the second value to a second source value if a second destination value is greater than the second source value;

adding the second value to the second destination value if the second source value is greater than the second destination value;

looking up a third value for a blue color component;

adding the third value to a third source value if a third destination value is greater than the third source value;

adding the third value to the third destination value if the third source value is greater than the third destination value.

7. The method of claim 1 wherein the encoding of custom data step further comprises the steps of:

encoding a third number to represent a color;

encoding a red color component;

encoding a green color component; and encoding a blue color component.

8. The method of claim 7 wherein the rendering step further comprises:

reading red, green, and blue color components from the encoded data; and setting a source color to the red, green, and blue color components.

9. The method of claim 1 wherein the encoding of the data is based on one byte.

10. An article of manufacture comprising:

a computer usable medium having computer readable program code embodied therein for displaying a text message on a display device, the computer readable program code in said article of manufacture comprising:

computer readable program code configured to cause a computer to create a mask for said text message;

computer readable program code configured to cause a computer to encode said mask and custom data into an encoded hybrid data block;

said computer code configured to cause a computer to encode said mask comprising:

computer readable program code configured to cause a computer to encode a first number if said mask indicates that a pixel contains only a source color;

computer readable program code configured to cause a computer to encode a second number if said mask indicates that a pixel contains only background information;

computer readable program code configured to cause a computer to encode an intensity value if said mask indicates that a pixel contains blend of a source color and background information;

computer readable program code configured to cause a computer to encode said second number twice if said mask indicates that an end of a scanline has been reached;

computer readable program code configured to cause a computer to render said encoded mask and custom data.

11. The article of manufacture of claim 10 wherein said mask creation comprises a plurality of events, said program code configured to cause said computer to create a mask further comprises:

computer readable program code configured to cause a computer to draw said text message in an enlarged form; and computer readable program code configured to cause a computer to shrink said enlarged text message to create a mask.

12. The article of manufacture of claim 10 wherein said mask creation comprises a plurality of events, said program code configured to cause said computer to create a mask further comprises:

computer readable program code configured to cause a computer to extract outline information from the text message;

computer readable program code configured to cause a computer to calculate intensity values of pixels based on the outline information; and computer readable program code configured to cause a computer to create a mask based on the intensity values.

13. The article of manufacture of claim 10 further comprising a computer readable program code configured to cause a computer to encode a number of times said source color or said background color repeats.

14. The article of manufacture of claim 13 wherein said rendering comprises a plurality of events, said program code configured to cause said computer to render further comprising:

computer readable program code configured to cause a computer to read a portion of the encoded data;

computer readable program code configured to cause a computer to determine if the encoded data is a mask or custom data;

computer readable program code configured to cause a computer to read the run value if the encoded data is the first number or the second number;

computer readable program code configured to cause a computer to set the run value number of destination pixels to a source color if the encoded data value is the first number;

computer readable program code configured to cause a computer to skip the run value number of destination pixels if the encoded data value is the second number and is not the end of a scanline;

if the encoded data is a blend value then computer readable program code configured to cause a computer to read the destination pixel;

computer readable program code configured to cause a computer to blend the destination pixel with a source color to a blended color; and computer readable program code configured to cause a computer to set the destination pixel to the blended color.

15. The article of manufacture of claim 14 wherein said blending of a destination pixel with a source color comprises a plurality of events, said program code configured to cause said computer to blend colors further comprising:

computer readable program code configured to cause a computer to look up a first value for a red color component;

computer readable program code configured to cause a computer to add the first value to a first source value if a first destination value is greater than the first source value;

computer readable program code configured to cause a computer to add the first value to the first destination value if the first source value is greater than the first destination value;

computer readable program code configured to cause a computer to look up a second value for a green color component;

computer readable program code configured to cause a computer to add the second value to a second source value if a second destination value is greater than the second source value;

computer readable program code configured to cause a computer to add the second value to the second destination value if the second source value is greater than the second destination value;

computer readable program code configured to cause a computer to look up a third value for a blue color component;

computer readable program code configured to cause a computer to add the third value to a third source value if a third destination value is greater than the third source value; and computer readable program code configured to cause a computer to add the third value to the third destination value if the third source value is greater than the third destination value.

16. The article of manufacture of claim 10 wherein said custom data encoding comprises a plurality of events, said program code configured to cause said computer to encode custom data further comprising:

computer readable program code configured to cause a computer to encode a third number to represent a color;

computer readable program code configured to cause a computer to encode a red color component;

computer readable program code configured to cause a computer to encode a green color component; and computer readable program code configured to cause a computer to encode a blue color component.

17. The article of manufacture of claim 16 wherein the rendering of the encoded mask and custom data further comprise a plurality of events, said program code configured to cause said computer to render further comprising:

computer readable program code configured to cause a computer to read red, green, and blue color components from the encoded data; and computer readable program code configured to cause a computer to set a source color to the red, green, and blue color components.

18. The article of manufacture of claim 10 further comprising computer readable program code configured to cause a computer to encode data based on one byte.

* * * * *